United States Patent
Sommer et al.

(10) Patent No.: US 12,458,156 B2
(45) Date of Patent: Nov. 4, 2025

(54) METHOD FOR THE COMPUTER-AIDED RECOGNITION OF A TRANSPORT CONTAINER BEING EMPTY, CONTROL DEVICE AND CHECKOUT TERMINAL

(71) Applicant: Wincor Nixdorf International GmbH, Paderborn (DE)

(72) Inventors: Martin Sommer, Berlin (DE); Alexander Knobloch, Paderborn (DE); Sebastian Engelnkemper, Langenberg (DE)

(73) Assignee: Wincor Nixdorf International GmbH, Paderborn (DE)

( * ) Notice: Subject to any disclaimer, the term of this patent is extended or adjusted under 35 U.S.C. 154(b) by 749 days.

(21) Appl. No.: 17/786,262

(22) PCT Filed: Dec. 8, 2020

(86) PCT No.: PCT/EP2020/085051
§ 371 (c)(1),
(2) Date: Nov. 30, 2022

(87) PCT Pub. No.: WO2021/122148
PCT Pub. Date: Jun. 24, 2021

(65) Prior Publication Data
US 2023/0129779 A1    Apr. 27, 2023

(30) Foreign Application Priority Data
Dec. 17, 2019   (EP) ..................................... 19217177

(51) Int. Cl.
*A47F 9/04*  (2006.01)
*G06Q 20/10* (2012.01)
(Continued)

(52) U.S. Cl.
CPC ........... *A47F 9/045* (2013.01); *G06Q 20/102* (2013.01); *G06T 7/194* (2017.01); *G06T 7/593* (2017.01);
(Continued)

(58) Field of Classification Search
CPC ......... A47F 9/045; G06T 7/194; G06T 7/593; G06T 2207/10012; G06T 2207/10028;
(Continued)

(56) References Cited

U.S. PATENT DOCUMENTS

| | | | |
|---|---|---|---|
| 11,048,266 B2 * | 6/2021 | Jeon | G05D 1/02 |
| 2008/0226129 A1 | 9/2008 | Kundu | |
| 2017/0243068 A1 * | 8/2017 | Sommer et al. | G06K 9/00 |

FOREIGN PATENT DOCUMENTS

| | | |
|---|---|---|
| DE | 102012103163 A1 | 10/2013 |
| EP | 3211611 A1 | 8/2017 |

OTHER PUBLICATIONS

International Search Report filed in the corresponding PCT Application dated Feb. 4, 2021, written in the German language; 4 pages.
(Continued)

*Primary Examiner* — Vu Le
*Assistant Examiner* — Matthew James Bodnark
(74) *Attorney, Agent, or Firm* — Black McCuskey

(57) ABSTRACT

A method for the computer-aided recognition of a transport container being empty can comprise: determining one or more than one segment of image data of the transport container using depth information assigned to the image data; assigning the image data to one from a plurality of classes, of which a first class represents the transport container being empty, and a second class represents the transport container being non-empty, wherein the one or more than one segment is not taken into account in the assigning;
(Continued)

outputting a signal which represents the filtered image data being assigned to the second class.

12 Claims, 10 Drawing Sheets

(51) Int. Cl.
  *G06T 7/194* (2017.01)
  *G06T 7/593* (2017.01)
  *G06V 10/26* (2022.01)
  *G06V 10/44* (2022.01)
  *G06V 10/70* (2022.01)
  *G06V 10/764* (2022.01)
  *G06V 10/82* (2022.01)
  *G06V 20/52* (2022.01)
  *G07G 1/00* (2006.01)
  *G07G 1/01* (2006.01)
  *G07G 3/00* (2006.01)

(52) U.S. Cl.
  CPC .......... *G06V 10/273* (2022.01); *G06V 10/443* (2022.01); *G06V 10/454* (2022.01); *G06V 10/764* (2022.01); *G06V 10/82* (2022.01); *G06V 10/87* (2022.01); *G06V 20/52* (2022.01); *G07G 1/0045* (2013.01); *G07G 1/01* (2013.01); *G07G 3/003* (2013.01); *G06T 2207/10012* (2013.01); *G06T 2207/10028* (2013.01); *G06T 2207/20024* (2013.01); *G06T 2207/20081* (2013.01); *G06T 2207/20084* (2013.01); *G06T 2207/30232* (2013.01)

(58) Field of Classification Search
  CPC . G06T 2207/20024; G06T 2207/20081; G06T 2207/20084; G06T 2207/30232; G06V 10/443; G06V 20/52; G06V 10/454; G06V 10/82; G06V 10/87; G06V 10/273; G06V 10/764; G06Q 20/102; G07G 1/0045; G07G 1/01; G07G 3/003
  See application file for complete search history.

(56) References Cited

OTHER PUBLICATIONS

International Search Report filed in the corresponding PCT Application dated Feb. 4, 2021, translated to the English language; 2 pages.
Written Opinion filed in the corresponding PCT Application dated Feb. 4, 2021, written in the German language; 8 pages.

\* cited by examiner

METHOD FOR THE COMPUTER-AIDED RECOGNITION OF A TRANSPORT CONTAINER BEING EMPTY, CONTROL DEVICE AND CHECKOUT TERMINAL

Various exemplary embodiments relate to a method for the computer-aided recognition of a transport container being empty, a control device and a checkout terminal.

In general, transport containers can be used to transport articles, e.g. goods in the field of production or sales. In this case, it may be necessary to recognize whether something, and if appropriate what, is situated in the transport container, e.g. when registering goods at a checkout exit (this may also be referred to as "Bottom of Basket" recognition—BoB). It is thus possible to reduce costs which arise if unregistered goods pass through the checkout exit without being recognized (this may also be referred to as loss prevention).

Compared with non-computer-aided methods, such as the use of ceiling mirrors, ID numbers on the chassis of the shopping trolley or video replays on the cashier's monitor, computer-aided methods demand less attentiveness on the part of the cashier and therefore constitute less of a burden on the cashier's productivity, and are more reliable and less susceptible to errors.

Computer-aided methods of pattern recognition are conventionally used to identify articles arranged in the transport container. In order to recognize non-empty shopping trolleys, for example, articles on the trolley repository are identified via object recognition of the articles or via image comparison with empty shopping trolleys. In order to identify articles, distinctive patterns of the articles are recognized and compared with a database in which the patterns of known articles are stored.

What these computer-aided methods have in common is that they require very much computing power on account of the image processing or pattern recognition employed, tend toward susceptibility to errors and have to be adapted to the range or the trolley types, i.e. increase the outlay in terms of personnel elsewhere.

Against this background, in accordance with various embodiments, a method for the computer-aided recognition of a transport container being empty, a control device and respectively a checkout terminal comprising the latter for carrying out the method are provided which require less computing power, reduce the susceptibility to errors, are more robust vis-à-vis disturbances and require fewer adaptations.

Illustratively, in accordance with various embodiments, a method for the computer-aided recognition of a transport container being empty is provided which reduces the complexity of the image data to be taken into account, for example image data of the transport container (which is possibly filled with one or more articles) that are recorded by means of a camera. This achieves the effect that less computing power is required and leaner algorithms can be used.

Illustratively, segments of the image data are filtered out (and e.g. discarded) before the latter are processed further, which reduces the complexity of the image data to be taken into account. The filtering can comprise discarding those segments of the image data which for example do not belong to the transport container but rather to a background (also referred to as image background) of the transport container, and so they are not taken into account for the recognition as empty. Those segments of the image data which are not to be taken into consideration can be determined using depth information (also referred to as depth segmenting). By way of example, the image data are sorted out pixelwise in accordance with their depth values. This achieves the effect that those segments of the image data which show spatial regions below the shopping basket, for example, are filtered out. This mechanism is based for example only on the depth information without taking account of the image content and is therefore dependent only on the spatial conditions. This achieves a high robustness and reliability of the depth segmenting.

Figure 5:
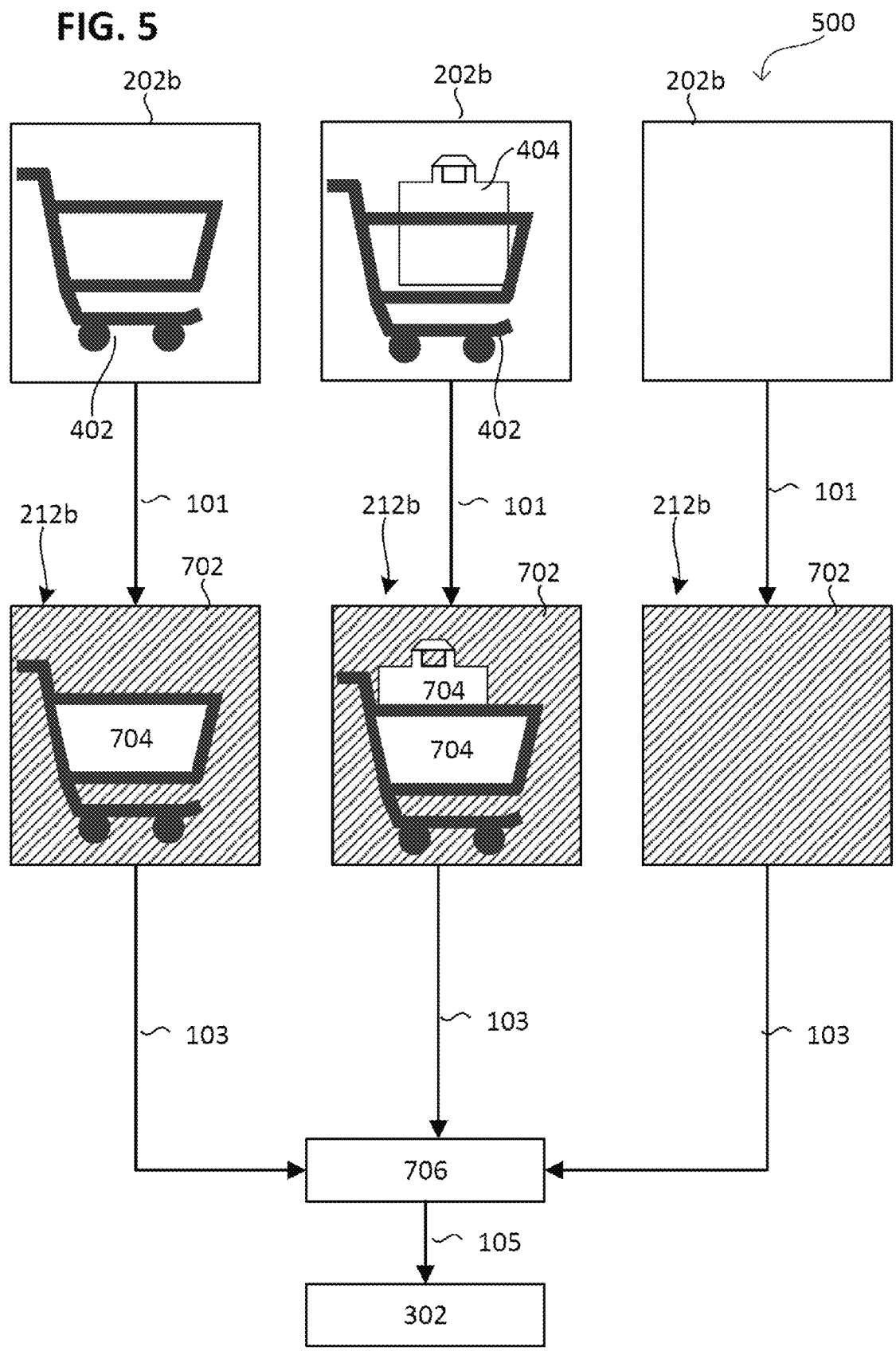
Figure 6:
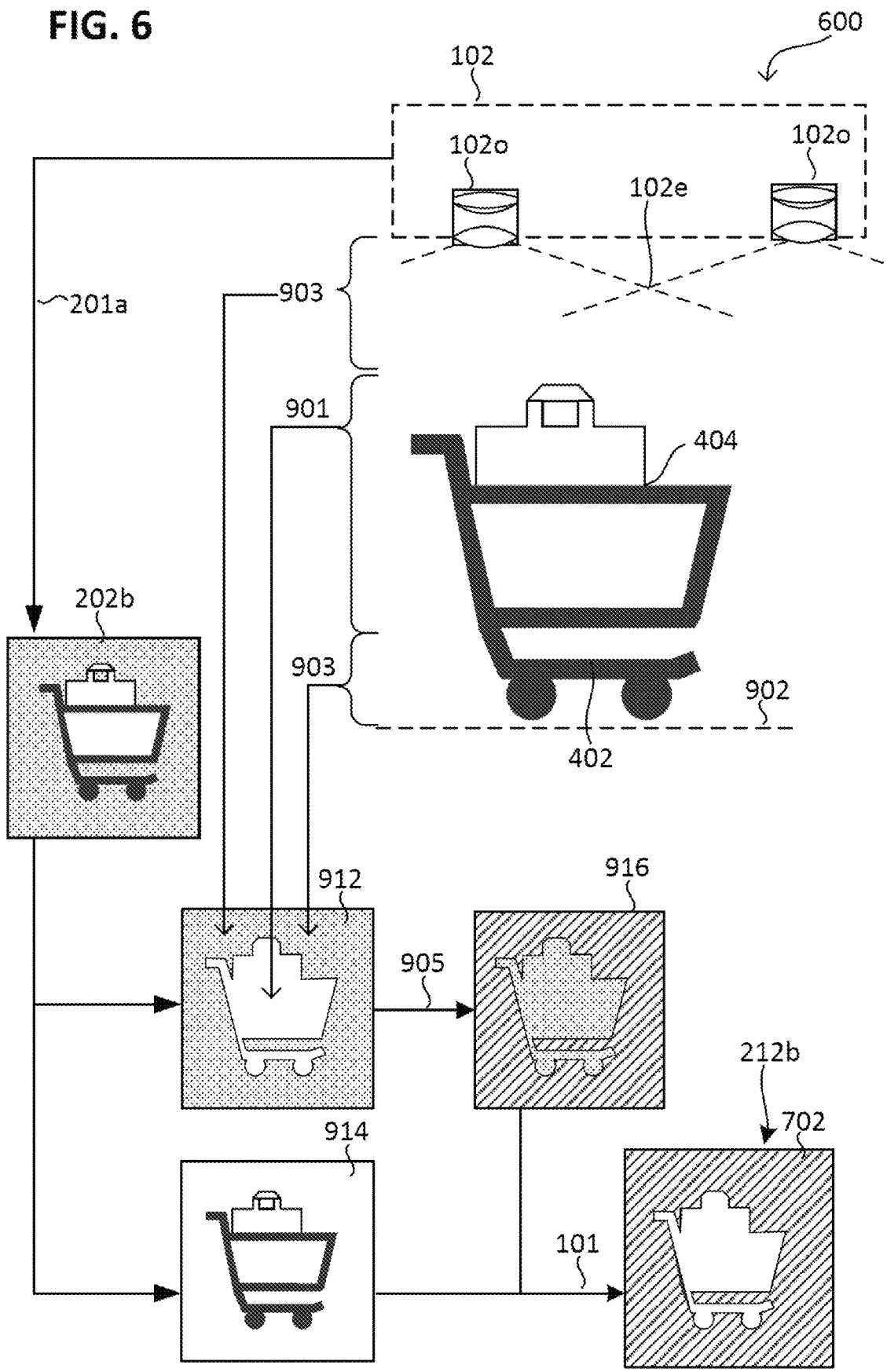
Figure 7:
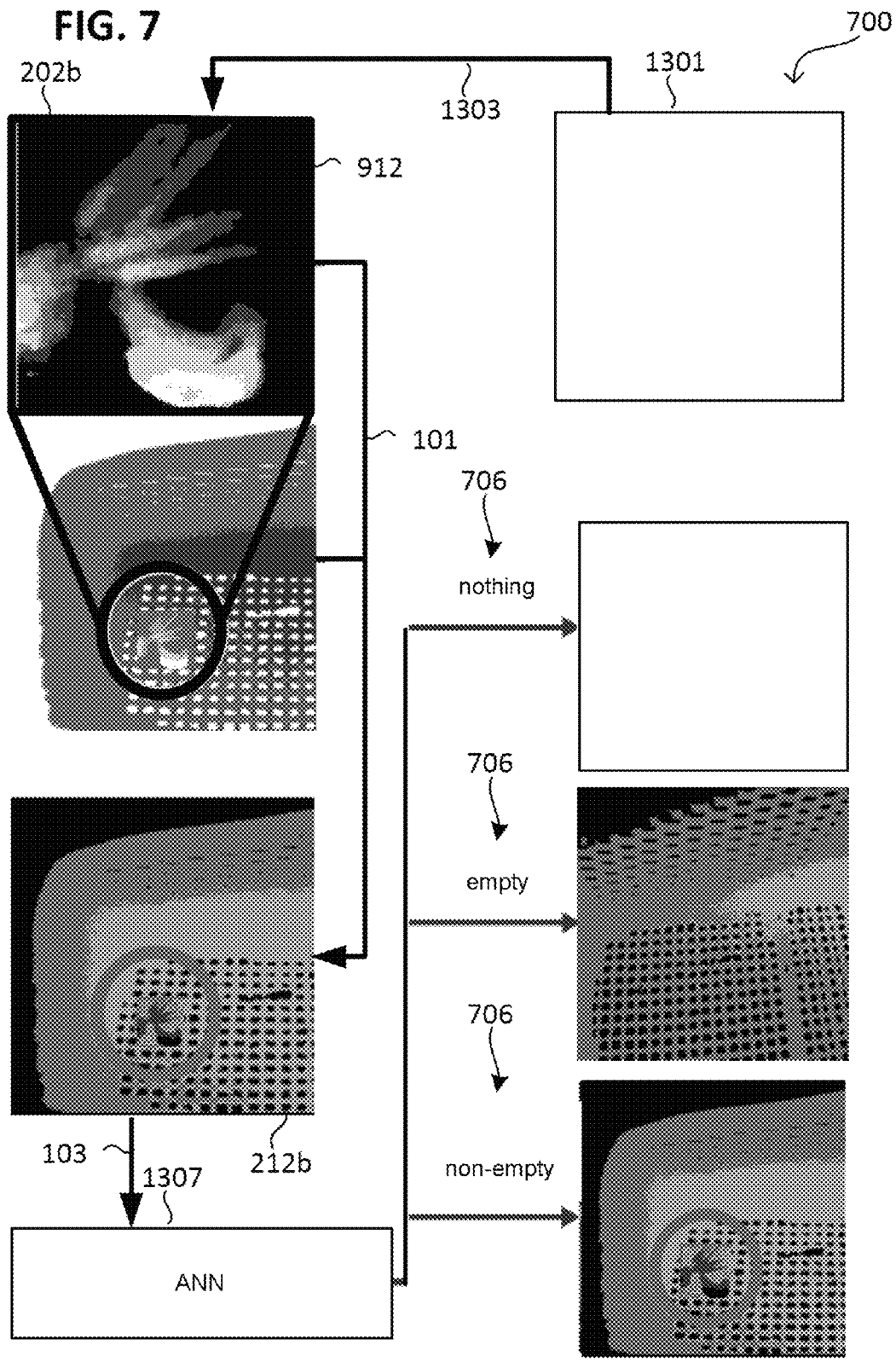
Figure 8:
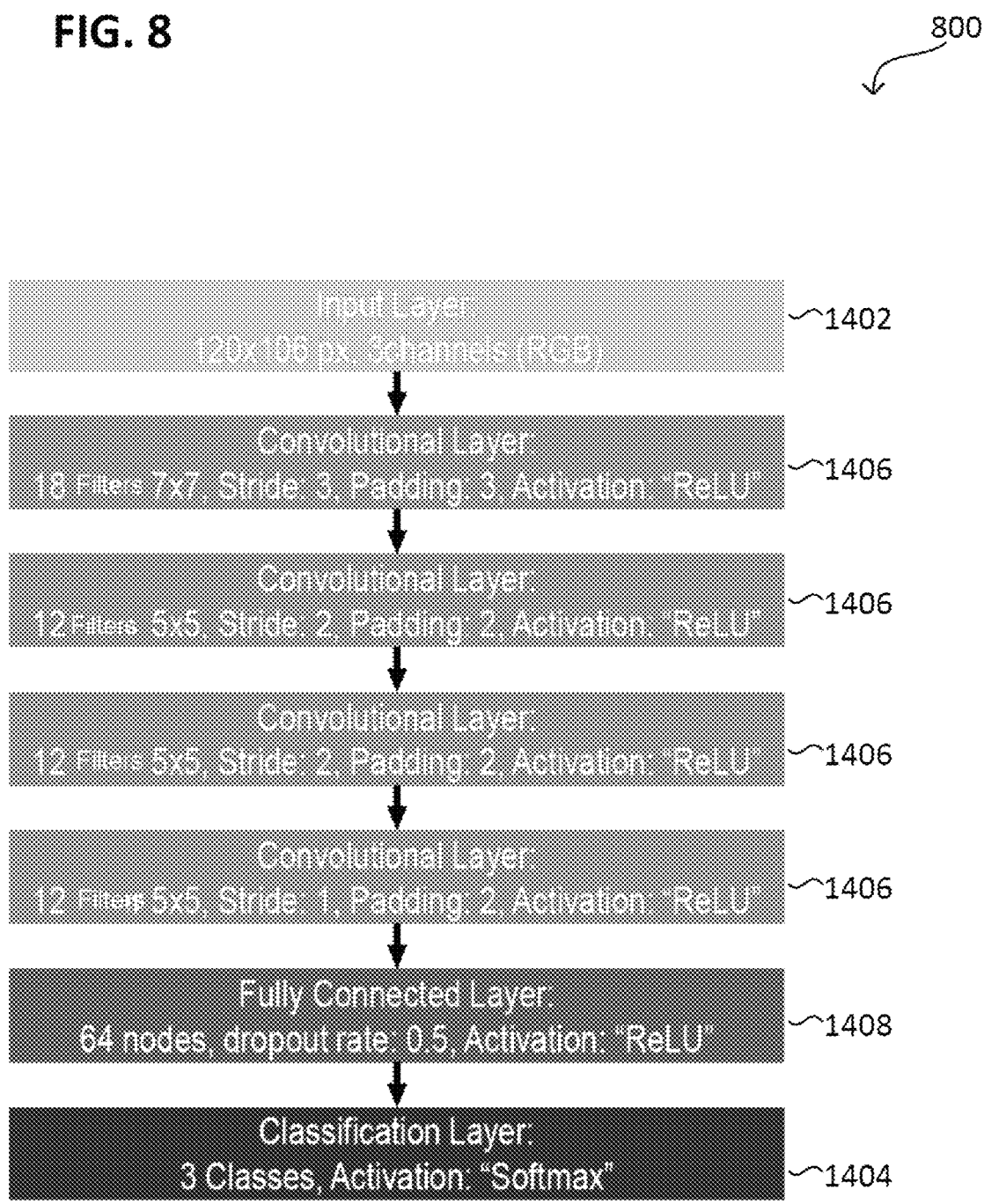
Figure 9:
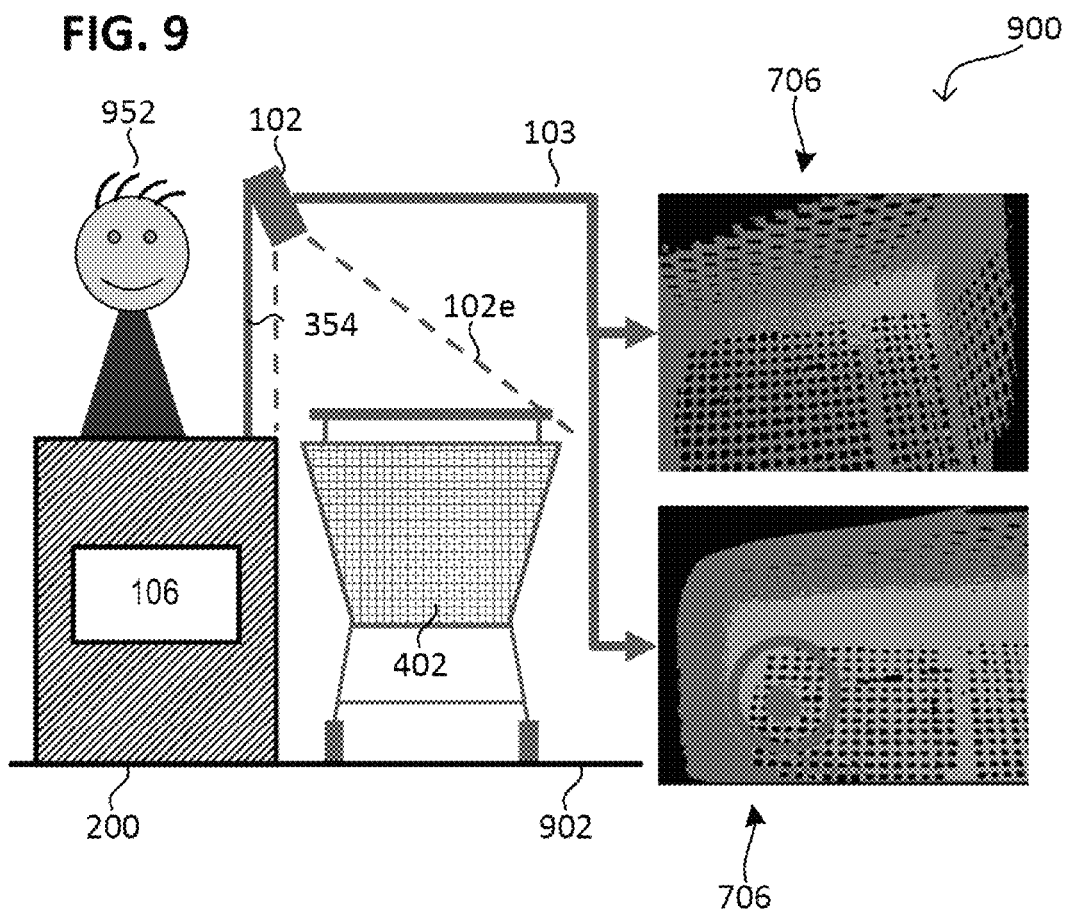
Figure 10:
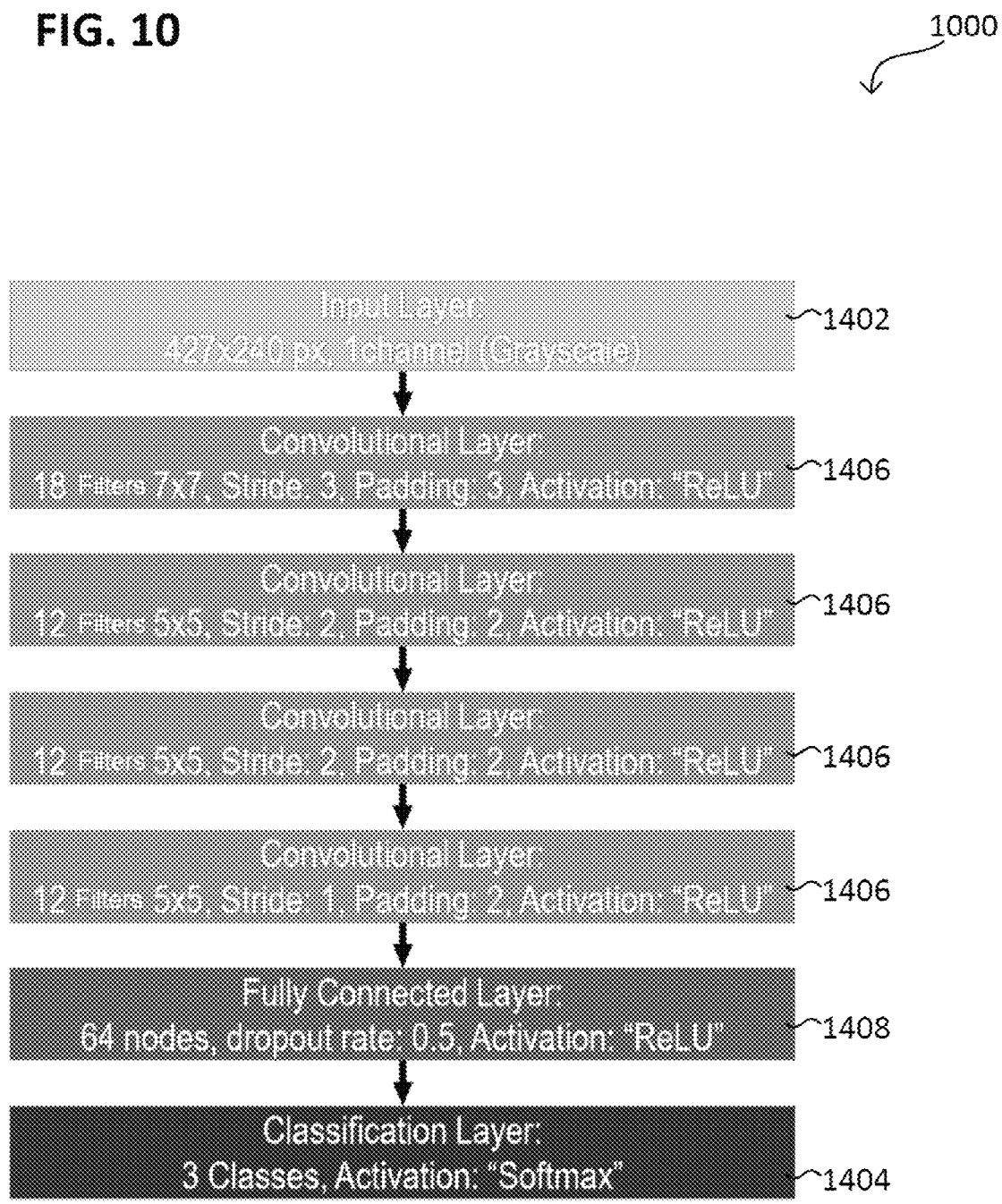

FIGS. 5, 6 and 7 each show a method in accordance with various embodiments in a schematic flow diagram;

FIGS. 8 and 10 each show a classifier in accordance with various embodiments in a schematic construction diagram; and FIG. 9 shows a checkout terminal in the method in accordance with various embodiments in a schematic side view.

In the following detailed description, reference is made to the accompanying drawings, which form part of this description and show for illustration purposes specific embodiments in which the invention can be implemented. In this regard, direction terminology such as, for instance, "at the top", "at the bottom", "at the front", "at the back", "front", "rear", etc. is used with respect to the orientation of the figure(s) described. Since components of embodiments can be positioned in a number of different orientations, the direction terminology serves for illustration and is not restrictive in any way whatsoever. It goes without saying that other embodiments can be used and structural or logical changes can be made, without departing from the scope of protection of the present invention. It goes without saying that the features of the various exemplary embodiments described here can be combined with one another, unless specifically indicated otherwise. Therefore, the following detailed description should not be interpreted in a restrictive sense, and the scope of protection of the present invention is defined by the appended claims.

In the context of this description, the terms "connected", "attached" and "coupled" are used to describe both a direct and an indirect connection (e.g. resistively and/or electrically conductively, e.g. an electrically conductive connection), a direct or indirect attachment and a direct or indirect coupling. In the figures, identical or similar elements are provided with identical reference signs, insofar as this is expedient.

In the context of this description, the terms "connected", "attached" and "coupled" are used to describe both a direct and an indirect connection (e.g. resistively and/or electrically conductively, e.g. a communication-enabled connection), a direct or indirect attachment and a direct or indirect coupling. In the figures, identical or similar elements are provided with identical reference signs, insofar as this is expedient.

The term "control device" can be understood as any type of entity which implements logic and which can comprise a circuitry interconnection and/or a processor, for example, which can execute software stored in a storage medium, in firmware or in a combination thereof and can output instructions on the basis thereof. The control device can be configured by means of code segments (e.g. software), for example, in order to control the operation of a system (e.g. the operating point thereof), e.g. of a machine or an apparatus, e.g. the components thereof.

The term "processor" can be understood as any type of entity which allows data or signals to be processed. The data or signals can be handled for example in accordance with at least one (i.e. one or more than one) specific function executed by the processor. A processor can comprise or be formed from an analog circuit, a digital circuit, a mixed-signal circuit, a logic circuit, a microprocessor, a central processing unit (CPU), a graphics processing unit (GPU), a digital signal processor (DSP), a programmable gate array (FPGA), an integrated circuit or any combination thereof. Any other type of implementation of the respective functions described more thoroughly below can also be understood as a processor or logic circuit. It is understood that one or more of the method steps described in detail herein can be implemented (e.g. realized) by a processor, by means of one or more specific functions executed by the processor. The processor can therefore be configured to carry out one of the methods described herein or the components thereof for information processing.

In accordance with various embodiments, a data memory (more generally also referred to as a storage medium) can be a non-volatile data memory. The data memory can comprise or be formed from a hard disk and/or at least one semiconductor memory (such as e.g. read only memory, random access memory and/or flash memory), for example. The read only memory can be for example an erasable programmable read only memory (can also be referred to as EPROM). The random access memory can be a non-volatile random access memory (can also be referred to as NVRAM—"non-volatile random access memory"). For example, one or more than one of the following can be stored in the data memory: a database (can also be referred to as a reference database), a processing algorithm; a criterion; code segments which implement one or more than one processing algorithm (also referred to as algorithm for simplification). The database can comprise one or more data sets, each data set of which assigns a product identifier to an item of payment information.

Reference is made herein to an artificial neural network (ANN), inter alia. The description can be analogously applicable if, as an alternative or in addition to the ANN, some other trainable algorithm is used, e.g. a support vector machine or a long short-term memory (also referred to as LSTM Long-Short-Term-Memory). The ANN can comprise a multiplicity of nodes (illustratively artificial neurons) and a connection network (the assignment of connections to nodes). Illustratively, in an ANN, the processes for taking in information and processing information are imitated analogously to biological neurons. This is realized by way of a number of layers of hidden neurons and activation functions that transfer the signals, the number being dependent on the conditions.

The topology of the algorithm describes the structure of the connection network, i.e. how many nodes are distributed among how many layers, and how these are interconnected. By way of example, a plurality of nodes can be arranged in layers situated one behind another, the first layer of which forms the input of the algorithm and the last layer of which forms the output of the algorithm. The last layer, the output of which actually becomes visible outside the connection network, is called the output layer. Layers preceding that are accordingly referred to as hidden layers. Using a graph the artificial neurons can be represented as nodes, and their connections as edges. In this case, by way of example, the algorithm is a directed graph with typed nodes.

After the algorithm has been designed, it is firstly trained (also referred to as the training phase), in which phase the algorithm is adapted to the mode of operation to be trained (illustratively "learns"). For this purpose, the algorithm is supplied with data (the training data), on the basis of which the algorithm learns to imitate the desired mode of operation. In this case, a correct output of the algorithm strengthens what has been learned (e.g. a specific signal path through the connection network), whereas an incorrect output weakens the signal path. In this way, those paths through the connection network which best describe the desired mode of operation gradually develop.

One or more than one of the following processes can take place in the training phase: modifying the connection network (e.g. forming or erasing connections); changing the weighting of nodes; modifying the properties (e.g. threshold values) of the nodes; modifying the number of nodes; modifying activation, propagation and/or output function.

During the training of the algorithm (e.g. the ANN), the training data are selected in accordance with the input parameters respectively desired. In one example, the incoming training data comprise image data of the capture region, from which data the respective target variable (e.g. class or objects to be recognized) is known. The training data can be synchronized and/or related to one another for example by way of time stamps or the origin thereof. It should be pointed out that both the parameters contained in the input vector of the algorithm and the parameters contained in the output vector of the algorithm are highly application-dependent and are selected accordingly.

Reference is made hereinafter to image data and the processing thereof. The image data can be a digital image representation of reality (e.g. of the capture region) at a point in time of capturing the image data. The imaging of reality can be effected by means of a lens, for example, which projects light onto the surface of an image capture sensor (e.g. a Bayer sensor). Capturing the image data can comprise reading the image capture sensor while the light is projected onto the surface thereof. The image data thus obtained can initially be in the so-called raw data format (also referred to as RAW), which comprises pixel by pixel the measured values read out from the image capture sensor and/or is processed as such. The image data can optionally be or have been converted into a different image format during processing, e.g. into raster graphics (different than RAW as raster graphics) or vector graphics, such that their further processing takes place in this image format, or they can be converted arbitrarily between these. The converting can optionally comprise interpolating the measured values from the image capture sensor (e.g. by means of demosaicing), e.g. in order to obtain complete multicolored color information for each pixel or in order to require less memory space or computing power. The image data can optionally be compressed (e.g. in order to require less memory space or computing power) or uncompressed (e.g. in order to avoid corruption). The respective image format can also define the color space according to which the color information is specified.

The simplest case is a binary color space, in which one black-and-white value is stored per pixel. In the case of a somewhat more complex color space (also referred to as grayscale color space), intermediate levels between black and white are stored (also referred to as grayscale values).

However, the color space can also be spanned by a plurality of (e.g. two or more) primary colors, such as red, green and blue, for example. If the measured values are intended to comprise multicolored color information, for example, a wavelength-sensitive image capture sensor can be used. The measured values thereof can be coded in accordance with a color space, for example. The color information or the underlying color space can therefore be multicolored (also referred to as polychromatic) or else single colored (also referred to as monochromatic). The monochromatic color information can for example comprise only grayscale values (then also referred to as grayscale value information) or comprise black-and-white values (then also referred to as black-and-white value information) which represent the intensity of the captured radiation at the wavelength or in the wavelength range for which the monochromatic sensor is sensitive. For visual rendering of the image data on a display device, said image data are converted into that image format which is predefined by the image memory of the graphics card. For greater ease of understanding, the image data described herein are represented as such visual rendering. In general, the image data, e.g. stored in a storage medium, can be present as a file (also referred to as a digital image or image file) in the respective image format.

The image data can furthermore be assigned (e.g. as an alternative or in addition to the color information) depth information (also referred to as 3D information). A so-called 3D camera can be used for capturing the depth information, as will be described in even greater detail later. The measured values of the 3D camera can comprise (e.g. pixel by pixel) information concerning a topography of the imaged reality (also referred to as depth information). By way of example, the depth information can specify the distance between a or each pixel of the camera and a location in space that is imaged onto the pixel.

The depth information can illustratively add a third spatial dimension (referred to as depth herein) to the two spatial dimensions represented by the image data. By way of example, by means of the image data, an object can be represented as a projection onto the two-dimensional surface of the image sensor (also referred to as 2D image data). In addition to this the depth information spans the third spatial dimension. By way of example, the depth information can comprise values (also referred to as depth values) which are assigned to the image data segmentwise (i.e. for each segment of the image data) and which indicate the depth thereof. By way of example, the depth information can comprise depth values which are assigned to the image data pixelwise (i.e. for each pixel of the image data) and which indicate the depth.

The image data can be segmented using the depth information, e.g. by the image data being subdivided into segments (e.g. pixels) of two types, depending on whether or not the depth values assigned to the segments satisfy a criterion. By way of example, the depth values of the segments of a first type may satisfy the criterion and the depth values of the segments of a second type may not satisfy the criterion. Optionally, more than two types can be used, if for example more than one criterion is used. The boundaries between the segments of the image data run along those depth values which substantially correspond to the criterion.

In accordance with various embodiments, the depth information is obtained by means of three-dimensional (3D) image capture. The depth information can be used for example to recognize whether an object is situated above a reference plane. The spatial distance from the reference plane at which an object is situated can thus be distinguished. By way of example, it is possible to obtain the depth information through the entire capture region, such that illustratively from above it is possible to recognize the spatial position of one or more than one object relative to the reference plane.

In accordance with various embodiments, the image capture device can provide image data of the capture region from a plurality of optical perspectives (e.g. provided by means of a plurality of lenses) which represent depth information of the capture region (e.g. stereoscopically). In order to determine the depth information, the image data captured from different perspectives (e.g. by means of a plurality of lenses) can be superposed on one another, e.g. taking account of a relative spatial pose (position and/or orientation) of the lenses with respect to one another. A camera can comprise an (optical) image capture sensor and at least one lens (also referred to as lens arrangement) assigned to the image capture sensor. The lens arrangement of a plenoptic camera can also comprise a grid of a plurality of microlenses. By way of example, the image capture device (e.g. RealSense F200, INTEL R200 Intel RealSense D415, Intel RealSense D435 and/or Intel SR300) can comprise an RGB image capture sensor and/or a 3D image capture sensor.

An image capture sensor (also referred to as an image sensor or an optical sensor) can comprise one or more photoelectrically active regions (can also be referred to as pixels) which generate and/or modify an electrical signal e.g. in response to electromagnetic radiation (e.g. light, e.g. visible light). The image capture sensor can comprise or be formed from a CCD sensor (charge-coupled device sensor) and/or an active pixel sensor (can also be referred to as CMOS sensor), for example. Optionally, an image capture sensor can be configured in a wavelength-sensitive fashion (e.g. for capturing color information), e.g. by means of a plurality of color filters (e.g. in grid form), and can thus distinguish between different wavelengths.

The depth information can be quantified, e.g. with indication of the depth as value (also referred to as depth value), can be coded or can itself be provided by means of image data, e.g. by assignment of image data captured simultaneously from a different perspective (e.g. separately from one another or superposed on one another). The plurality of simultaneously captured perspectives can be superposed on one another, for example, in order to quantify the depth information. Each depth value of the depth information can then correspond for example to a deviation between the plurality of simultaneously captured perspectives.

By means of a 3D-based segmentation of the image data and classification by means of an ANN, it is possible to simplify the recognition as empty. In this regard, firstly the case of fraud can be detected, and secondly the overall process can be analyzed for deviations from normal behavior. Thus the entire checkout process (also referred to as checkout procedure) can be assessed optionally in respect of its suspiciousness and/or optionally an employee can be informed.

On account of the preprocessing of the image data by means of a depth-based segmentation and also a targeted optimization of the architecture of the ANN to the given problem formulation, very high recognition rates can be achieved in comparison with conventional mechanisms. Alternatively or additionally, on account of the preprocessing of the image data by means of a depth-based segmentation (also referred to as depth segmenting) and also a targeted optimization of the architecture of the ANN to the given problem formulation, more cost-effective hardware can be made possible in comparison with conventional mechanisms. Illustratively, less computing power is necessary to achieve high recognition rates.

In accordance with various embodiments, a checkout terminal can be configured to register the products that a customer wants to purchase, e.g. by means of scanning the products on a scanner (e.g. a barcode scanner). Furthermore, the checkout terminal can comprise a (e.g. digital) cash register system (for example comprising a self-service cash register or a cashier's workstation) configured to carry out a payment process. The payment process can comprise for example the customer also paying for the products to be purchased. The cash register system can comprise at least one of the following: a screen (e.g. a touch-sensitive screen), a printer (e.g. for printing out an invoice and/or a label), a (e.g. programmable) cash register keyboard (can also be part of the touch-sensitive screen), a payment means terminal for accepting a payment means (e.g. cash or a debit card). The payment means terminal can be for example an electronic payment means terminal (can also be referred to as EC terminal, "EC"—electronic cash, e.g. for reading a debit card and/or a credit card). By way of example, the checkout terminal can comprise a (e.g. digital) cash register system configured to carry out one or more cash register system processes, such as a checkout session, for example. A checkout session can comprise for example a calculating process, an inventory process and/or a checkout process.

In the case of a self-service checkout terminal, the cash register system and the scanner can be arranged on the same side (e.g. of a pole) of the checkout terminal, such that they can be operated from one position. In the case of a non-self-service checkout terminal (also referred to as cashier checkout terminal), the cash register system and the scanner can be operable from different sides.

Hereinafter, reference is made to products (e.g. goods, may also be referred to as articles) as objects. The description given can analogously also apply to other objects which can be transported in a transport container.

In accordance with various embodiments, recognition of articles that have remained inside the transport container, e.g. on a lower crate support of the shopping trolley, can be made possible. Illustratively, recognition of whether or not an article (e.g. product, may also be referred to as object) is arranged in the transport container can be facilitated by comparison with conventional pattern recognition. This recognition can be effected optically by analyzing image data. In accordance with various embodiments, the complexity of the image data can be reduced by the image constituents which show only the environment being filtered out by means of a comparison with depth information. This achieves the effect that the complexity of the quantity of data to be analyzed is reduced and fewer disturbance variables occur (the quantity of data can remain the same, for example).

Figure 1:
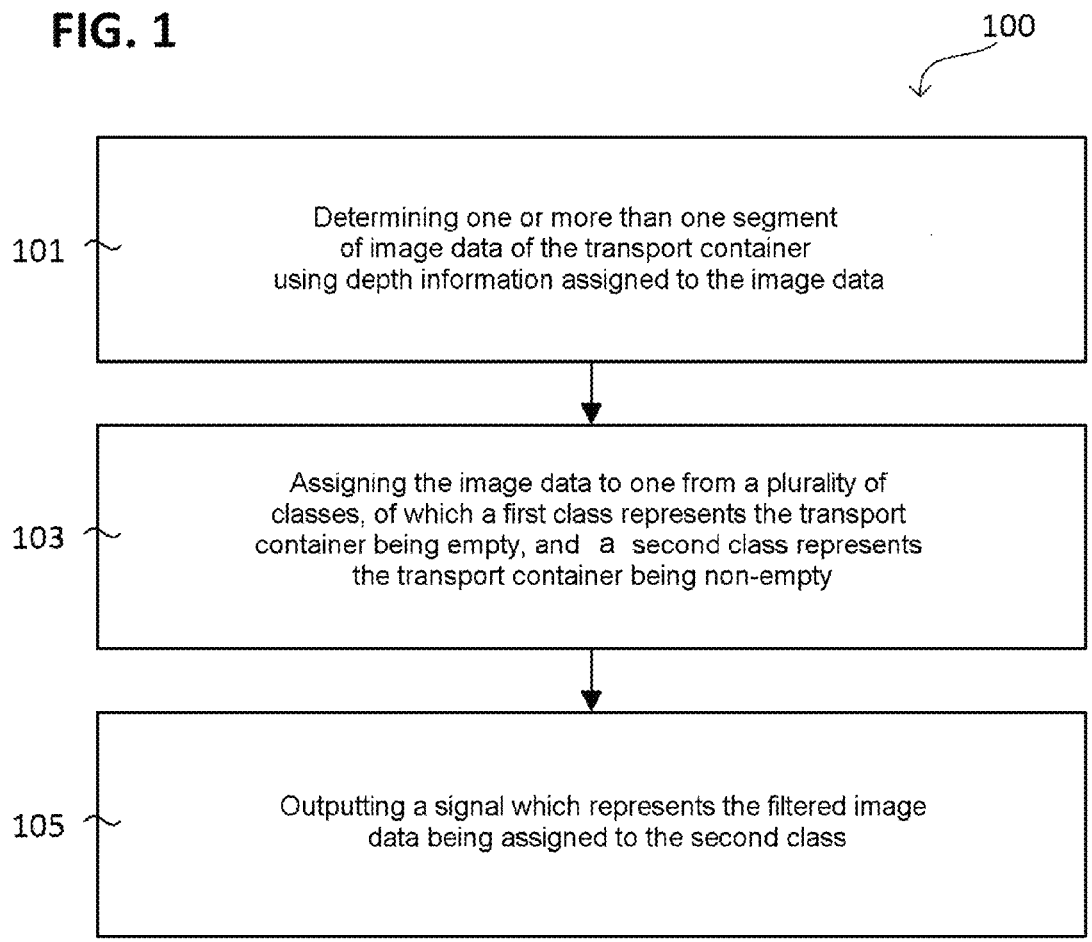
FIG. 1 shows a method in accordance with various embodiments in a schematic flow diagram.

FIG. 1 illustrates a method 100 in accordance with various embodiments in a schematic flow diagram.

The method 100 can comprise, in 101, determining one or more than one segment of image data of the transport container using depth information assigned to the image data (also referred to as depth segmenting 101); in 103, assigning the image data to one from a plurality of classes (also referred to as classifying 103), of which a first class represents the transport container being empty, and a second class represents the transport container being non-empty; and in 105, outputting a signal which represents the filtered image data being assigned to the first class and/or to the second class.

The or each segment of the image data (also referred to as data segment) can comprise one or more than one pixel, for example.

The depth segmenting can comprise for example determining a multiplicity of data segments (which are separated from one another, for example), e.g. at least 5 data segments, e.g. at least 10 data segments, e.g. at least 50 data segments.

The one or more than one data segment determined can be disregarded in the classifying (also referred to herein illustratively as filtering out), e.g. by its being discarded, being masked, being modified, etc. In other words, the filtering out can comprise the depth segmenting and selective classifying, which has the effect that the segment determined by means of the depth segmenting is not taken into account in the classifying.

Examples which implement the filtering out comprise the or each data segment determined by means of the depth segmenting:
  being removed (i.e. discarded) from the image information before this is fed to the classifying,
  being masked (e.g. being hidden before the classifying) before this is fed to the classifying,
  being replaced (e.g. with pixels of uniform color information) before this is fed to the classifying,
  being marked as not to be taken into account before this is fed to the classifying.

It goes without saying that it is also possible to use some other selective mechanism which has the effect that the information of the segment determined by means of the depth segmenting is not taken into account in the classifying. Hereinafter, reference is made to concrete implementations (e.g. inter alia to the replacing and the masking) of the filtering out. The description given can analogously apply to some other selective mechanism which has the effect that the information of the segment determined by means of the depth segmenting is not taken into account in the classifying.

The depth segmenting 101 can illustratively achieve the effect that only the portion of the image data representing the interior of the transport container is fed to the classifying. In other words, the monitored image region can be delimited to a region of interest (may also be referred to as ROI or analysis region) in which the interior of the transport container is arranged.

The classifying 103 can be effected by means of an algorithm which is for example robust vis-à-vis a change in the type of the transport container (also referred to as container type). However, it may be necessary, for example, to carry out training for fundamentally different container types, e.g. differing from one another in terms of material (e.g. metal or plastic), separately from one another, as will be described in even more specific detail later.

Carrying out the method 100 can optionally be effected in response to capturing an event which represents a transport container being present in the spatial region (also referred to as capture region) from which the image data are captured. Capturing the event can be effected by means of motion recognition, for example. The motion recognition can be effected for example on the basis of the image data and/or by means of a motion sensor. The event can likewise comprise the beginning of a checkout session, as will be described in even more specific detail later.

As an alternative thereto, the method 100 can be cyclically repeated (e.g. permanently), e.g. irrespective of whether a transport container is present.

In an implementation with low complexity, the depth information can be or have been determined by means of stereoscopic infrared image data. In other words, determining depth information can be effected by means of capturing infrared radiation. The infrared radiation can have a wavelength in a range of approximately 700 nm (nanometers) to approximately 1400 nm (e.g. 1000 nm), e.g. approximately 900 nm. Alternatively or additionally, an optical pattern (e.g. point pattern) can be emitted into the capture region, the depth information being determined on the basis of said pattern.

The infrared image data can thus be monochromatic. However, it is also possible to use polychromatic image data (i.e. comprising color information), e.g. red-yellow-green information.

The depth segmenting 101 can be applied for example (e.g. only) to the stereoscopic infrared image data, e.g. to one of the plurality of perspectives of the stereoscopic infrared image data. In more general terms, the depth segmenting 101 can be applied to the same sensor data or at least one portion thereof which are also taken as a basis for determining the depth information. This simplifies the required image capture device. In the case of the optical pattern, just one perspective can be present, for example, to which the depth segmenting 101 is applied.

If the second class is assigned to the image data, it is possible optionally, e.g. in response thereto, to capture 2D image data in the visible spectral range (e.g. in a range of from approximately 380 nm to approximately 780 nm), which are output for example as a video signal or still image. On the basis of said data, a cashier (or some other employee) can check and optionally acknowledge (e.g. confirm or reject) the result of the classifying 103.

By virtue of the one or more than one data segment determined not being taken into account in the classifying 103, the information content fed to the classifying is reduced (compared with the entire image data being fed). This makes it possible to use a less complex algorithm for the classifying 103, e.g. with fewer nodes and/or requiring less computing power.

By way of example, it is possible to curtail the image information in the depth region starting from a chosen distance, such that, starting from a predefined (e.g. stored) depth value, the image information deliberately no longer influences the classification. For the classification, for example, a segmented (grayscale) image, e.g. without the feet of a user, wheels of the container, etc. or other articles/structures below the lower repository of the transport container, should be fed to the classification. This prevents image contents arranged on the supporting surface or below the container interior from leading to incorrect classifications. By way of example, it is also possible to avoid incorrect classifications as a result of different textures on the supporting surface below the shopping trolley.

Figure 2:
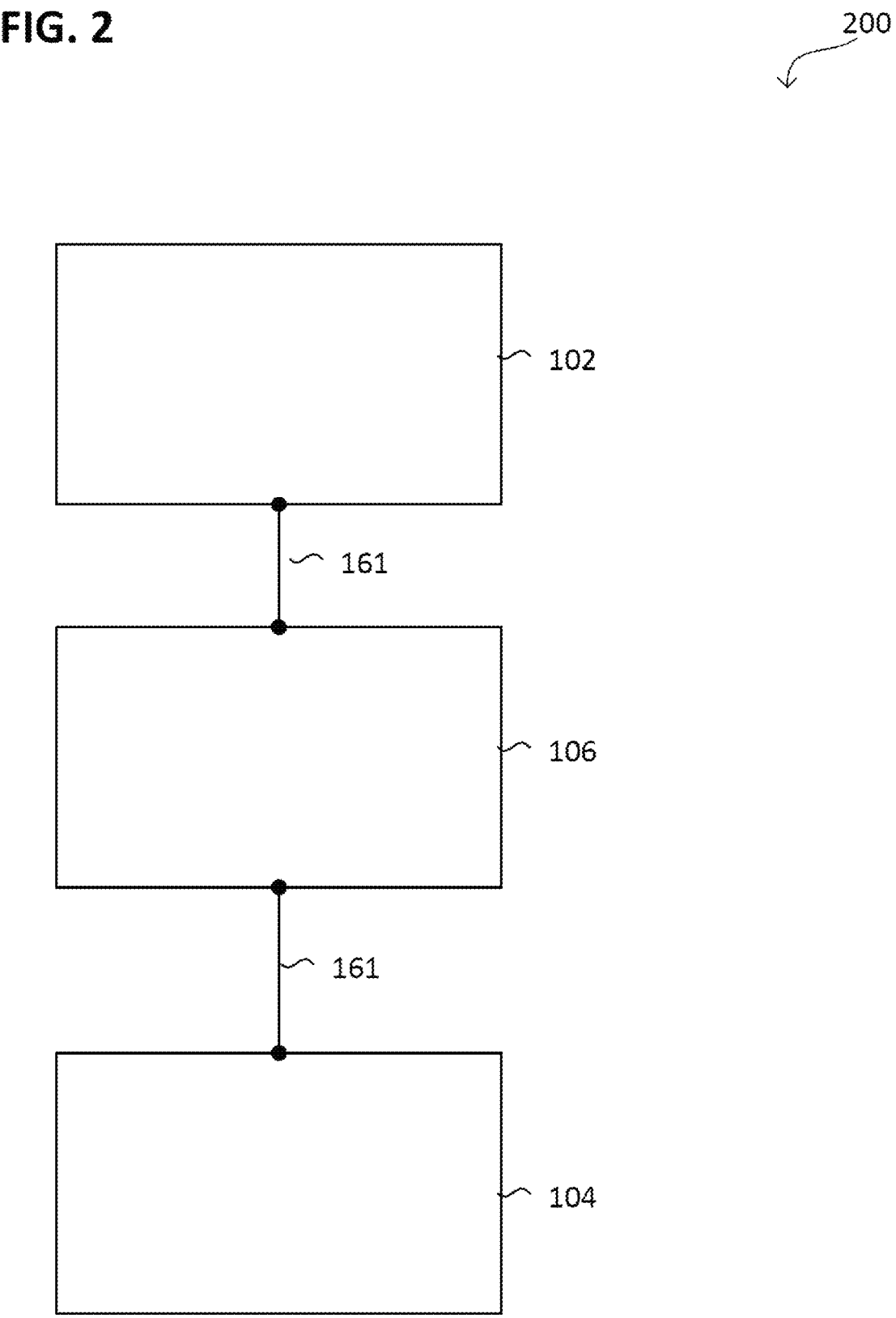
FIG. 2 shows a checkout terminal in accordance with various embodiments in a schematic construction diagram.

FIG. 2 illustrates a checkout terminal 200 in accordance with various embodiments in a schematic construction diagram. The checkout terminal 200 can comprise an image capture device 102, a product capture device 104 and a control device 106. The control device 106 can be communicatively 161 coupled to the image capture device 102 and the product capture device 104, e.g. by means of a field bus communication network 161 or some other data bus 161. A field bus communication network can be used for use in the field of automation technology. Some other data transfer path 161 can also be used in the field of cash register systems.

The image capture device 102 can be configured to supply the control device 106 with image data of the capture region (e.g. in the raw data format or a preprocessed version of the raw data format), e.g. pixel-based image data (also referred to as raster graphics). The image capture device 102 can be arranged above the capture region, for example. The image capture device 102 can comprise one or more than one camera, for example, as will be described in even more specific detail later.

The product capture device 104 can be configured to supply the control device 106 with a product identifier that it has captured. The product identifier can be uniquely assigned to a product or the type thereof, for example. The product identifier can be determined for example on the basis of an optical feature (also referred to as identifier feature) of the product which is captured. The identifier feature (e.g. a pattern) can comprise a visual code representing the product identifier, e.g. a binary code or the like (e.g. recognition algorithms corresponding to ArUco markers, since these algorithms are designed for rapid position recognition on moving objects). By way of example, the identifier feature can comprise a barcode or some other machine-readable code.

By means of the product capture device 104, it is possible to effect product by product determining of the individual product identifiers (also referred to as identifier capturing). The region in which the product capture device 104 can capture the product can be for example a product capture zone. The identifier capturing can comprise presenting a product to be captured to the product capture device 104. The presenting can comprise arranging the product to be captured in the product capture zone and orienting the identifier feature of said product in the direction of the product capture device 104.

By way of example, the product capture device 104 can comprise an optical capture device, an RFID scanning device (radio frequency identification) or the like. The optical capture device can comprise for example a barcode scanning device or an image scanning device. The barcode scanning device can include corresponding sensors for implementing a scanning functionality, such as, for example, one or more than one infrared sensor, one or more than one camera and the like. The product capture device 104 can be configured for example to capture the machine-readable code and to be able to process it in order to extract the product identifier therefrom.

The product capture device 104 and the image capture device 102 can comprise a corresponding infrastructure (e.g. comprising processor, storage medium and/or bus system) or the like, which implements a measuring chain. The measuring chain can be configured to drive the corresponding sensors (e.g. camera, scanner, etc.), to process the measurement variable thereof as input variable and, on the basis thereof, to provide the image data or product identifier as output variable.

The product capture device 104, the image capture device 102 and the control device 106 need not necessarily comprise dedicated infrastructures, however. By way of example, their information processing functions can also be provided as components of the same software (also referred to as application) which is executed by one or more than one processor of the checkout terminal 200. It is also possible, of course, to use a plurality of applications and/or a plurality of processors (e.g. a combination thereof) which provide the information processing functions of the product capture device 104, of the image capture device 102 and of the control device 106.

The control device 106 can be configured to implement the method 100, as is described by way of example below.

Figure 3:
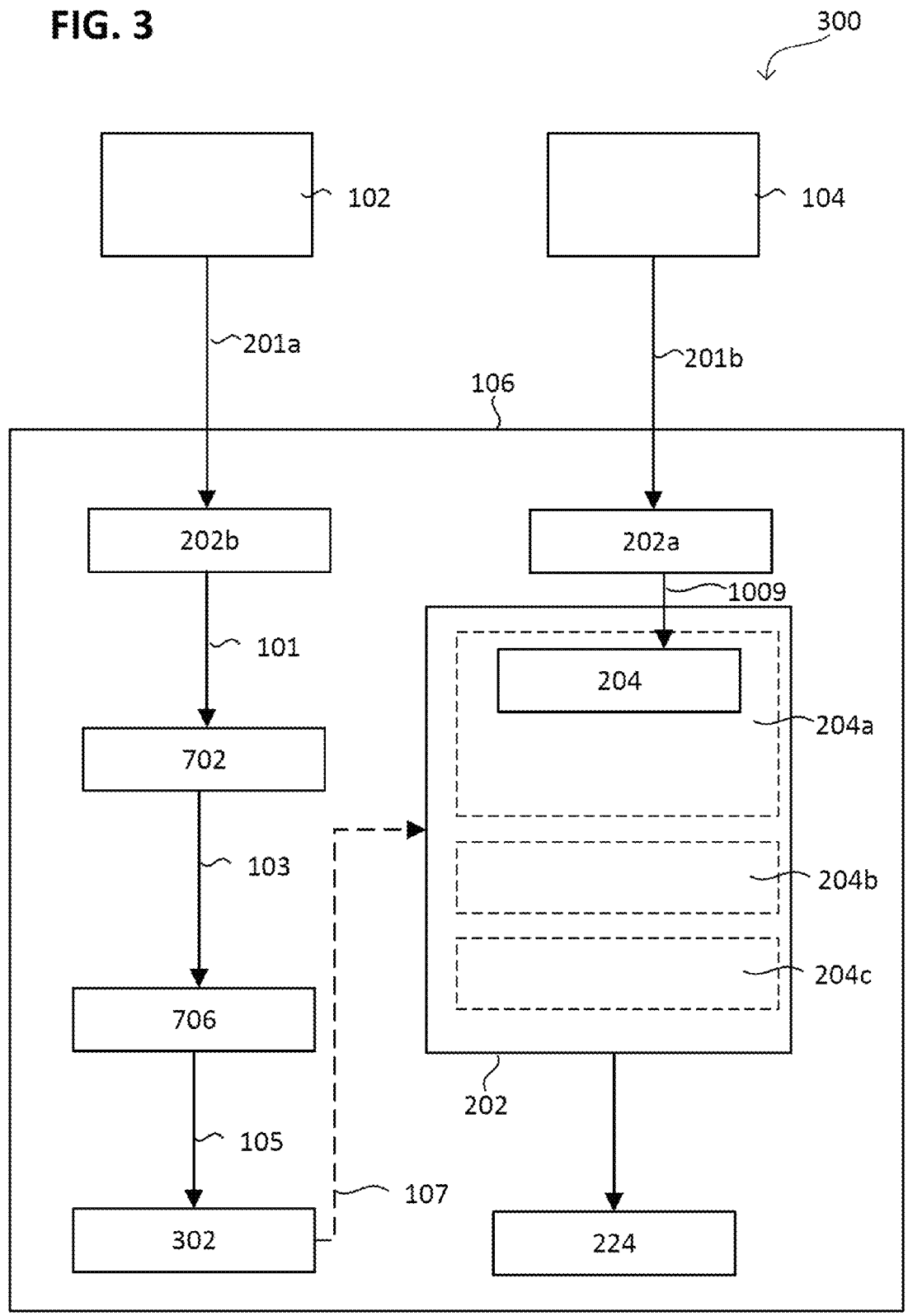
FIG. 3 illustrates a checkout terminal 300 in a schematic communication diagram.

FIG. 3 illustrates a checkout terminal 200 in accordance with various embodiments 300 in a schematic communication diagram.

The image capture device 102 can be configured to supply 201a the control device 106 with the image data 202b and/or depth information of the capture region (e.g. in the raw data format or a preprocessed version of the raw data format), e.g. continuously as a sequence. The product capture device 104 can be configured to supply 201b the control device 106 with a captured product identifier 202a.

The control device 106 can be configured for determining 1009 payment information 204 on the basis of the product identifier 202a (also referred to as payment information determining). The payment information 204 can illustratively represent what price is invoked for the corresponding product with the product identifier 202a. By way of example, the captured product identifier 202a can be compared with a database for this purpose.

By way of example, the control device 106 can be configured to start a checkout session 202, e.g. in response to a determined event (also referred to as session start event) which represents that a self-service checkout is intended to be effected. Examples of the session start event can comprise a user standing in front of the checkout terminal 200 and/or performing a corresponding input on the latter, a product having been presented to the product capture device 104, and/or a previous checkout session having ended.

In a similar manner, the control device 106 can be configured to end the checkout session 202, e.g. in response to a determined event (also referred to as session end event) which represents that billing of the self-service checkout is intended to be effected. Examples of the session end event can comprise a user performing a corresponding input on the checkout terminal 300, a bank card or some other payment means having been detected by the checkout terminal 300, and/or a predefined time period having elapsed since the last product was captured.

For the purpose of ending the checkout session 202, the control device 106 can be configured to determine billing information 224 and to display it by means of a display device of the checkout terminal 200. The payment information 204 determined during a checkout session 202 be aggregated, for example, and the result of the aggregating can be added to the billing information 224. The billing information 224 can illustratively indicate what total to be paid is produced by the registered products. The billing information 224 can optionally comprise further information, such as, for example, the proportion of taxes, a list of the products captured, an itemized list of the products captured, or the like.

In order to end the checkout session 202, a payment process can furthermore be initiated, by means of which the sum to be paid can be settled in accordance with the billing information 224. The settling can be effected for example by means of the payment means terminal (not illustrated).

The control device 106 can be configured to carry out the method 100 on the basis of the image data 202b. For this purpose, the control device can determine 101 one or more than one segment 702 (also referred to as data segment) of the image data 202b and carry out the classifying 103 of the image data without the one or more than one data segment determined. The class 706 of the image data can be determined by means of the classifying 103. The control device 106 can furthermore be configured to output 105 the signal 302.

The class 706 of the image data can be for example the first class (also referred to as empty class or as class "empty") or the second class (also referred to as non-empty class or as class "non-empty"). If no transport container was arranged in the capture region, the class can be a third class (also referred to as nothing class or as class "nothing"), which represents the image data not representing a transport container or no transport container having been present in the capture region.

It goes without saying that the method 100 can also be carried out in the manner of random sampling, e.g. only for a portion of the checkout sessions 202.

The signal 302 can be configured for example to intervene 107 in the checkout session 202 (or some other process of the checkout terminal 200) and/or to actuate one or more than one component of the checkout terminal 200, e.g. in order to output perceptible information that represents the result of the classifying 103 and/or requests acknowledgement of the result of the classifying 103.

Figure 4:
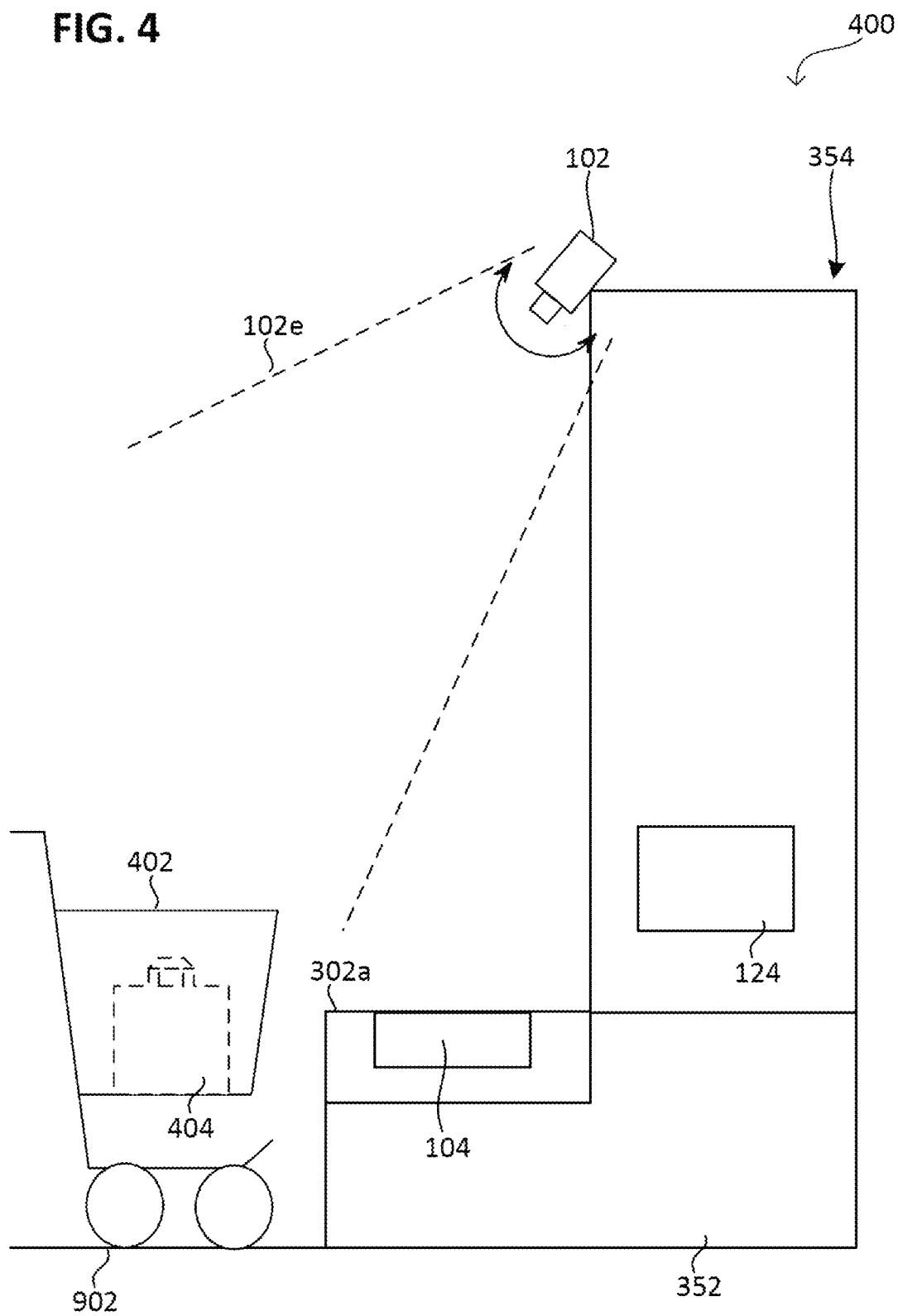
FIG. 4 shows a checkout terminal in accordance with various embodiments in a schematic side view.

FIG. 4 illustrates a checkout terminal 400 in a schematic side view.

In general, the checkout terminal 400 can comprise a supporting structure 352, which supports various components of the checkout terminal 400, for example a placement device 302a, the image capture device 102, the product capture device 104, the control device (not illustrated), etc. The supporting structure 352 can comprise for example a framework and a housing secured thereto, wherein the housing houses the sensitive components of the checkout terminal 400. The supporting structure 352 can comprise for example a base, by which the supporting structure 352 stands on a surface underneath 902, and a vertically extended section 354 (illustratively also referred to as pole or "pole mount"), which supports the components attached in an elevated fashion, e.g. the image capture device 102. The surface underneath 902 can be used as a reference plane 902 for the depth information, for example representing the depth zero, viewed from which positions above the surface underneath 902 have negative depth values.

The placement device 302a can comprise for example one or more than one conveyor belt and/or the product capture device 104 (e.g. a scanner). More generally, the placement device 302a can provide one or more than one placement plane (e.g. a checkout table), on which the products can be placed and/or moved across it.

The image capture device 102 can be configured to capture image data of the capture region 102e. For this purpose, the image capture device 102 can comprise one or more than one camera. By way of example, the image capture device 102 can be configured to generate image data which comprise depth information of the capture region 102e.

For determining the depth information, the image capture device 102 can comprise for example one or more than one 3D camera (also referred to as 3-dimensional camera). A 3D camera can generally be configured to capture image data comprising the depth information (and are thus assigned thereto), or to provide the depth information separately from the image data but assigned thereto. The assignment can be configured in such a way that one segment (e.g. pixel) of the image information is assigned to each depth value of the depth information.

Examples of a 3D camera comprise: a plenoptic camera (also referred to as a light field camera), a stereoscopic camera (also referred to for short as stereo camera), a camera with a triangulation system, a TOF camera (time of flight camera), a camera with an interference system. In this case, a stereo camera is a particularly cost-effective 3D camera that is easier to implement. A stereo camera is likewise more robust vis-à-vis reflective surfaces and does not require a laser, which reduces the health risk for persons in public spaces. A so-called passive stereo camera therefore does not necessarily require a laser. By contrast, a so-called active stereo camera (e.g. Intel RealSense D415) can comprise an infrared laser projector for emitting a point pattern (a so-called IR-active stereo camera). In more general terms, the active stereo camera can be configured to emit structured light that need not necessarily be point light and/or IR light.

The TOF camera can be configured for example to illuminate the capture region 102e by means of a light pulse and to capture for each pixel a time (the so-called time of flight) needed by the light pulse to return again. In general, however, a signal of a different type (e.g. sound) can also be used in order to measure a spatial distribution of the time of flight of the signal (e.g. an ultrasonic time of flight method). This makes it possible to use a camera constructed even more simply or to provide a higher image resolution in comparison with a light pulse.

Alternatively or additionally, a different mechanism can also be used in order to provide the depth information. By way of example, the image capture device 102 can be configured to use a variable focus (autofocus) for determining the depth information. The focus can be directed for example onto the bottom of the transport container, such that the distance between the image capture device 102 and the bottom of the transport container can be determined as depth information on the basis of the focus position. Alternatively or additionally the depth information can be determined on the basis of an edge contrast measurement and/or a phase comparison.

The or each placement device 302a can be configured in such a way that one or more than one product can be placed thereon. For this purpose, a placement device 302a can comprise for example a placement shelf, a placement hook for bags and/or a placement table. Optionally, the or each placement device 302a can have scales configured to detect a weight of the products placed on the placement device. By way of example, the placement device 302a can comprise three zones of product handling: a placement location for products not yet captured (e.g. scanned), the product capture zone (e.g. scanning zone), i.e. the partial region during scanning, and a placement location for scanned products.

Optionally, the checkout terminal 400 can comprise an information output device 124, as will be described in even more specific detail later. The information output device 124 can be configured for example to output (e.g. audible or visible) information perceptible to humans, e.g. by means of a display device of the information output device 124. The information can comprise for example a request and/or support for the user. The outputting of the information and/or the content of the information can be instructed by means of the signal 302, for example.

During a checkout session 202, a transport container 402 can be arranged in the capture region or can be moved through the latter, e.g. in a manner situated on the surface underneath 902. The transport container 402 can be empty or one or more than one product 404 can be arranged in the transport container 402, such that the latter is non-empty. This difference, i.e. whether the transport container 402 is empty or not, can be determined by means of the recognition as empty.

FIG. 5 illustrates the method 500, e.g. implemented by means of the control device 106.

In 101, it is possible to filter out one or more than one data segment from the image data 202b which represent the immobile (invariant) background of the capture region 102e (also referred to as depth segmenting or more illustratively as freeing) and is not intended to be taken into account in the classifying 103. In more general terms, the depth segmenting 101 can be effected using the depth information.

The depth information can indicate a depth for example pixelwise, e.g. a distance from the image capture device 102 or some other reference object 902 (e.g. the reference plane 902). By way of example, those data segments which have an illustratively large depth can be filtered out 101. Alternatively or additionally, those data constituents which illustratively have a small depth can be protected from the filtering out 101. The depth segmenting is less sensitive to the prevailing light situation, to reflections, or to other disturbances in the capture region 102e. In more general terms, the depth segmenting can comprise superposing the depth information and the color information of the image data on one another, such that those data constituents which have a large depth are filtered out 101.

By way of example, a filter mask (also referred to as mask for simplification) can be used for the depth segmenting. A filter mask can comprise for example a graphics filter and a segmentation mask. The segmentation mask can indicate illustratively (e.g. pixelwise), e.g. by means of a brightness value, the data segments (e.g. pixels) of the image data 202b to which the graphics filter is intended to be applied or which are intended to be protected from an application of the graphics filter. By way of example, bright regions of the segmentation mask can indicate that the graphics filter is intended to be applied, and dark regions can indicate that the graphics filter is not intended to be applied, or vice versa. It goes without saying that gradations between bright and dark can also be used in order to attain a partial application of the graphics filter and/or a transition. The application of the graphics filter can comprise for example changing the color information of the image data, e.g. darkening it (e.g. by means of a black filter), replacing it (e.g. by means of a replacing filter) or removing it (e.g. by means of a removing filter). The mask can comprise the same pixel-related dimensions (also referred to as pixel extent) as the color information (e.g. infrared information).

The segmentation mask can be applied to a corresponding graphics filter as an intermediate step, for example, thereby attaining selective application of the graphics filter to the image data 202b. Filtered image data 212b (also referred to as additional image data 212b) representing the movable objects 402, 404 freed in accordance with the depth information in the capture region 102e are obtained as a result of the depth segmenting 101, e.g. without their background. The depth segmenting 101 can comprise for example masking one or more than one image data segment 702 (also referred to for short as segment or data segment) of the image data which represents the background of the capture region 102e, and/or discarding it (e.g. not using it further in the classifying).

The depth segmenting 101 can comprise for example mapping the depth information onto the mask according to which the image data are masked or segmented. The mapping can be effected by means of a function, for example, which need not necessarily be continuous. A discontinuous function can provide for example a shock transition between applying the graphics filter and protecting against the application thereof.

In 500, the depth segmenting 101 can be effected for example by means of processing the image data 202b. As an alternative or in addition thereto, however, the depth segmenting 101 can also be effected focally, e.g. by using a small depth of field or high depth-of-field blur when capturing the image data. This achieves the effect that the background of the capture region 102e is imaged unsharply when focusing on the object 404, 402. In this case, the image data 202b can already comprise the one or more than the one freed object. For focal depth segmenting, it is possible to use an image capture device which provides a small depth of field (e.g. of a few centimeters). A small depth of field can be provided for example by means of a large image sensor (e.g. more than 2.5 cm) and/or a small f-number (e.g. less than 2.0). In more general terms, the hyperfocal distance of the image capture device 102 can be greater than the distance between the latter and the object or the reference plane. By way of example, the image sensor can have a diagonal extent that is larger than the depth of field. Hereinafter, reference is made to the processed 212b image data. The description given can analogously apply to optically freed image data.

In accordance with various embodiments, the depth information can be used for depth segmenting the movable objects arranged above the reference plane 902. The depth information can once again be determined by a stereoscopic camera. The latter determines the distance (illustratively depth) of specific image regions by way of the disparity of the different perspectives of the stereoscopic camera. The depth of field of the stereoscopic camera can, but need not necessarily, be used.

In connection with a stereo camera or determining depth information, the term disparity (also referred to as deviation) denotes a positional offset adopted by the same object in the imaging from two different perspectives. The focal points of the two lenses associated with the perspectives are at a distance b from one another. If both lenses have the focal length f, it holds true for the distance r between the object and the lenses (also referred to as depth) that r=b·f/d, where d denotes the disparity. The depth information r of an object can thus be determined on the basis of a determined disparity of the object in the stereo image. A disparity map of a stereo image is thus tantamount to a depth image indicating the spatial distribution of the depth information. The disparity map can be determined by means of a census transformation, for example.

In general, the depth segmenting can be effected wholly or partly. The depth segmenting can result in the contrast and/or the imaging sharpness of those data constituents of the image data which represent the background being reduced.

In one easily understandable example of depth segmenting, the image data 202b are subdivided into data segments (also referred to as segmenting) with a stored threshold value as a criterion for the subdividing. By way of example, it is possible to determine one or more than one first data segment 702 (illustrated in a hatched manner), the depth value of which is in each case greater than the threshold value (i.e. illustratively represents the background of the capture region 102e), i.e. the criterion is satisfied. By way of example, the first data segment 702 can represent the environment. Furthermore, it is possible to determine a second data segment 704 (also referred to as object data segment), the depth value of which is in each case less than the threshold value. By way of example, the second data segment 704 can represent one or more than one movable object (e.g. the transport container 402 and/or the product 404 therein) in the capture region 102e. The first data segment 702 (also referred to as environment data segment) can be filtered out by being removed, blackened or marked, for example.

In addition to the depth segmenting, the depth segmenting can optionally be effected using the image data of the empty capture region (also referred to as comparison filtering). By way of example, those data constituents which correspond to the image data of the empty capture region can be filtered out.

In addition to the depth segmenting and/or the comparison filtering, the depth segmenting can optionally be effected using the color information of the image data (also referred to as color filtering), for example the RGB information (red-green-blue information). By way of example, those data constituents which have a specific color (for example the color of the background) can be filtered out. The color filtering can be effected for example color channel by color channel, e.g. individually for the red channel, the blue channel and the green channel. It goes without saying that a different color space than RGB can also be used.

However, the comparison filtering and/or the color filtering may be susceptible to the current light situation and/or reflections and can therefore be used for example only to support the depth segmenting. Alternatively or additionally, in contrast to the case of depth segmenting, it may be necessary to adapt the comparison filter regularly to the situation and/or it may be necessary to adapt the color filtering at least once per "location".

Preferably, only the depth segmenting can be effected (optionally together with the color filtering). Some other combination of a plurality of types of filtering out 101 can also be effected, e.g. a combination of depth segmenting together with color filtering and/or comparison filtering. In general, a combination of different types of filtering out 101 makes it possible to obtain more information and/or a lower sensitivity to disturbances.

As a result of the depth segmenting 101, those data constituents can remain as to be taken into account in the classifying 103 which represent a movable object 402, 404 in the capture region 102e, said object differing from the immobile (invariant) background of the capture region 102e. This makes it possible to optimize the quantity of data fed to the classifying 103, and to reduce error sources.

In 103, the filtered image data 212b can be classified 103 (also referred to as classifying 103, more precisely as classing), i.e. can be assigned to one class 706 from a plurality of classes (also referred to as image class). The classifying can be effected on the basis of the filtered image data 212b, e.g. by means of a classifier or the like, which is applied to the filtered image data 212b. The corresponding class 706 can be assigned depending on whether an empty or non-empty transport container is recognized on the basis of the filtered image data 212b.

The plurality of image classes can comprise for example an empty class (also referred to as class "empty"), which indicates that no movable object 404 was recognized in the transport container 402 on the basis of the filtered image data 212b (i.e. the transport container 402 was empty). The plurality of image classes can comprise a non-empty class (also referred to as class "non-empty"), which indicates that one or more than one movable object 404 was recognized in the transport container 402. The plurality of image classes can optionally comprise a third class (also referred to as class "nothing") which represents the recognition region being empty or no transport container 402 having been recognized.

In accordance with various embodiments, the classifying 103 can be effected by means of a trained processing algorithm (also referred to as classification algorithm or classifier for simplification). A classifier described herein can be provided for example by means of an artificial neural network (ANN), as will be described in more specific detail herein. In addition to the ANN, the classifier can optionally also be implemented by means of object recognition, edge recognition, a transformation, size recognition and/or color recognition.

Examples of the training data for training the classification algorithm can comprise: image data of the empty recognition region, image data of the recognition region with an empty transport container, image data of the recognition region with a non-empty transport container. Examples of a target variable for training the classification algorithm can comprise the plurality of image classes.

Alternative or additional possible examples of training data (also referred to as input vectors) can comprise the depth information, such that the latter illustratively need not necessarily be used only for the depth segmenting. In a similar manner, the depth information can optionally also be taken into account in the classifying 103.

Alternatively or additionally possible examples of target variables can comprise the class "non-empty" being subdivided further in order to compare the appearance of the articles with one or more than one reference appearance. By way of example, during the classifying it is already possible to determine how much is arranged in the non-empty transport container 402. As a measure thereof, it is possible to use for example an area of the transport container that is occupied as non-empty or a variable representing this area.

For example, a subdivision of the class "non-empty" can be or have been provided, for example into a subclass "non-empty but acceptable" and a subclass "non-empty and unacceptable". The subclass "non-empty but acceptable" can be determined for example if the appearance of the or each object in the transport container cannot be assigned to any article which (e.g. the pattern and/or product identifier thereof) is stored in the database. Examples of such an object include: wallet or purse, sales receipt, shopping bag. This makes it possible to achieve a reduction of "false alarms". The subclass "non-empty but acceptable" can optionally be mapped onto the class "empty", such that for example no signal or the signal of the class "empty" is output.

Examples of the processing algorithm can comprise various forms of machine learning for image classification, such as, for example:
- the so-called "histogram of oriented gradients" (HOG) in combination with a support vector machine (SVM);
- a pretrained ANN with "standard architecture" (e.g. GoogLeNet) which is furthermore adapted to the given problem by "transfer learning" and fine adaptation.

However, the latter entails more stringent hardware requirements and/or higher error rates for the given problem, since the pretraining database is very different than the input vectors considered here.

If the filtered (and thus reduced) image data 212b are fed to the classification algorithm, it is possible to use a less complex algorithm and/or a less powerful processor which executes the classification algorithm. Illustratively, the filtered image data 212b substantially only comprise those data portions which represent objects disjoint from the background, or are empty. Thus, the quantity of data to be processed is optimized and the classes are separated from one another to a greater extent.

In 105, the signal 302 can be output on the basis of a result 706 of the classifying 103.

In an implementation with low complexity, the classification algorithm can for example only provide a distinction between an empty transport container and the non-empty transport container. The class "nothing" can for example be determined automatically if the filtered image data 212b are filtered (e.g. blackened) to the extent of more than 99%. The class "nothing" can for example be determined automatically if no transport container is present in the capture region 102e. By way of example, on the basis of the 2D image data, it is possible to recognize whether a transport container 402 is arranged in the capture region 102e (i.e. whether a transport container 402 is present).

By way of example, recognizing the presence of the transport container 402 can trigger the carrying out of the method 500.

By way of example, recognizing the presence of the transport container 402 can be effected by means of capturing reflections (on objects), e.g. in the IR range. It is possible to recognize whether the reflections originate from a transport container, e.g. from the structure thereof, and/or from markers. Alternatively or additionally, color information (of the 2D image data) and/or the depth information can be used to recognize whether the transport container 402 is present. However, it is also possible to use other mechanisms to recognize the presence of the transport container, for example scales in the surface underneath 902, a light barrier, a motion detector, etc.

In accordance with various embodiments, a combination of one or more than one 3D camera and/or one or more than one RGB camera as 2D camera can be provided above the checkout table. A calibration algorithm can train (also referred to as training) the processing algorithm on the basis of the visible 3D geometry of the capture region 102e in front of the checkout terminal (if the latter is empty) and approximates this 3D geometry through planes of varying relative distance. On the basis of the topology thus determined for the capture region 102e to be monitored, an object situated above the reference plane 902 can be effectively freed from the background. This mechanism is more effective than a purely RGB image-based segmentation or pattern recognition and is virtually independent of environment influences such as light projection, shadow casting and reflections. The resulting image data 212b can thus likewise be virtually independent of said influences or the location of the checkout terminal. This enables a robust classification of the image data without complex training of the algorithms for each individual location.

The calibration to the reference plane 902 and thereby later freeing of objects can be effected independently of the classification of the preprocessed image data. By way of example, a classifier that was trained in a specific geometry after the freeing can also be applied in a different (e.g. similar) geometry without renewed training. As long as the geometry remains comparable, i.e. approximately the same distances between the relevant objects and the camera, the algorithm can be trained on one checkout terminal 200 (or else in a readjusted geometry) and be used on another checkout terminal 200. The calibration to the given reference plane ensures that the image data are not only independent of the environment, but also virtually independent of the concrete geometry of the checkout terminal 200.

FIG. 6 illustrates the method 600. The method 600 can be or have been implemented by means of the control device 106, for example.

The image data 202b captured by means of the image capture device 102 can comprise color image data 914 and depth image data 912. The color image data 914 can comprise a pixel matrix with (monochromatic or polychromatic) color information, wherein the color information indicates as a value of each pixel the color value thereof. The depth image data 912 can comprise a pixel matrix with depth information, wherein the depth information indicates as a value of each pixel the depth value thereof.

The depth image data 912 and the color image data 914 can be captured by means of the same camera or by means of separate cameras (e.g. cameras separated from one another). For example, a 3D camera can determine the depth image data 912 and an RGB camera can determine the color image data 914.

The depth information can be or have been provided by means of a stereo camera as 3D camera, for example. A stereo camera can comprise a plurality of (e.g. two) lenses 102o arranged next to one another and directed at the capture region 102e. The plurality of lenses 102o can be configured to image the capture region 102e onto one or more than one image capture sensor of the image capture device 102. The image capture sensor can be infrared-sensitive, for example, i.e. capture infrared radiation.

By means of the stereo camera, illustratively, image data are captured which represent a plurality of perspectives of the capture region 102e at the same time (also referred to as stereoscopic image data), i.e. which represent the capture region 102e as viewed from different directions and/or from different locations. For this purpose, the exposure control and/or the focusing of the lenses can be coupled to one another, for example.

The depth information can be determined on the basis of the stereoscopic image data of the capture region 102e. By way of example, the different perspectives of the stereoscopic image data can be superposed on one another and the depth information can be derived therefrom. The description given for the stereoscopic image capture device 102 can analogously also apply to a differently configured image capture device 102 that implements a different mechanism in order to provide the depth information.

In general, the depth information 912 can comprise information which establishes a spatial relationship relating a plurality of segments of the image data to one another and/or to a reference object 902, 102. The corresponding image data segment can be assigned a respective depth value representing the spatial relationship. By way of example, individual pixels (e.g. the depth information 912 can be resolved pixelwise) or a plurality of pixels (the so-called pixel group) can be used as image data segment. The reference object 902, 402 can comprise or be formed from the image capture device 102 and/or the reference plane 902, for example. By way of example, the depth information 912 can indicate pixelwise a distance from the reference object 902, 102 as depth value.

The depth information 912 can be mapped onto the color information. For this purpose, the depth information can be mapped 905 onto a filter mask 916. The filter mask 916 can be provided for example according to the image data 202b as vector graphics or raster graphics. The application thereof to the color information can color the image data segments outside the layer of interest 901 black, for example. The fact of whether an image data segment lies within the layer of interest 901, and is thus taken into account in the classifying, or lies outside the layer of interest 901, and is therefore not taken into account in the classifying, can be determined by determining whether a depth value assigned to the segment satisfies a stored criterion.

By way of example, those image data segments whose depth information satisfies a predefined (e.g. stored) criterion are filtered out 101 and thus not taken into account in the classifying 103. The criterion can illustratively be satisfied if the depth information represents a small distance from the reference object 902, 402, e.g. less than 20 centimeters, e.g. less than 10 centimeters. As a result of the filtering out 101, those image data segments 704 can remain which represent an object 404, 402 within a layer 901 (also referred to as layer of interest 901) of the capture region 102e. The layer of interest 901 can be spatially separated from the reference object 902, 402, e.g. from a layer not of interest 903 adjoining the reference object 902, 402.

The layer of interest 901 can be arranged for example in such a way that one or more than one base (e.g. base wall and/or base lattice) of the transport container 402 and/or a container interior of the transport container 402 are/is arranged in the layer of interest 901. The boundaries of the layer of interest 901 can be used for example for forming (e.g. delimiting) the criterion.

The criterion can be satisfied for example if the depth information (e.g. the value thereof) represents a distance from the reference object 902 of less than approximately 20 centimeters (e.g. 10 centimeters) and/or more than approximately 1.5 meters (e.g. 2 meters).

FIG. 7 illustrates the method 700, for example implemented by means of the control device 106.

The method 700 can comprise, in 1301, calibration of the or each processing algorithm (also referred to as calibrating). By way of example, the criterion can be formed or updated by means of calibrating.

The calibrating 1301 may be necessary for example only once, e.g. upon the system start and/or after assembly of the checkout terminal 200, and may be omitted later. Alternatively or additionally, the calibrating 1301 can be repeated, e.g. in quiescent phases of the checkout terminal 200. The calibrating 1301 can comprise capturing first image data of the empty capture region 102e (e.g. the reference plane thereof) by means of the image capture device 102. The first image data can comprise depth information and/or color information (e.g. both captured simultaneously) (also referred to as reference depth information and/or reference color information, respectively). The reference plane 902 can for example be planar and therefore have no or only little topography (also referred to as 3D structure). The first image data of the empty capture region 102e can be stored and/or used as training data for the processing algorithm (e.g. the object recognition algorithm and/or the classification algorithm).

The calibrating 1301 can be effected by means of the calibration algorithm, which determines or updates for example the criterion on the basis of the reference depth information and/or reference color information. The criterion can specify a threshold value, for example, which is greater than each value of the reference depth information, e.g. than a sum of the reference depth information and a tolerance value. The tolerance value can be for example 20 centimeters or less, e.g. 10 centimeters or less. The criterion can be satisfied for example if the depth value exceeds the threshold value.

The method 700 can comprise, in 1303, capturing by means of the image capture device 102 second image data of the capture region 102e (e.g. the reference plane thereof), in which for example a transport container and optionally a product (also referred to as article) in the transport container are arranged. The second image data 202b can comprise depth information and/or color information (e.g. both captured simultaneously). The depth information can represent for example the topography above the reference plane 902 by means of a bright/dark gradation.

The method 700 can comprise, in 101, applying the depth segmenting to the second image data 202b. Third image data 212b (also referred to as segmented image data 212b) can be provided as a result of the depth segmenting 101. The third image data 212b can comprise one or more than one object data segment of the second image data 202b which represents one or more than one movable object (e.g. the transport container and optionally an object, e.g. article, therein) in the capture region 102e (or the zone thereof), and/or comprise fewer background data segments than the first image data 202b.

The depth segmenting 101 can for example comprise filtering out the color information pixelwise in accordance with the depth information. By way of example, each pixel of the image data whose assigned depth value satisfies the criterion can be filtered out in this way. The filtering out can for example comprise blackening those pixels of the image data whose assigned values of the depth information items substantially correspond to the reference plane 902 (which for example illustratively do not lie above the reference plane). As a result of the masking, it is possible for only the pixels of the one or more than one object data segment not to be black and for the remaining pixels to be black.

The method 700 can comprise, in 103, carrying out the process of classifying the third image data 212b (i.e. the segmented image data). The classifying 103 can be effected for example by means of a classifier 1307, e.g. by means of an ANN. As a result of the classifying 103, one class 706 from a plurality of (e.g. two or more, e.g. exactly three) classes can be assigned to the third image data. The plurality of classes can comprise for example: the class "empty" and the class "non-empty" and also optionally the class "nothing".

FIG. 8 illustrates the classifier 1307 in accordance with various embodiments in a schematic construction diagram 800, for example configured in accordance with the method 100 and/or implemented by means of the control device 106. The classifier 1307 can be configured as a convolutional neural network. It goes without saying that a differently configured classifier 1307 which provides the corresponding functions can also be used.

The classifier 1307 can comprise a plurality of layers ("Layer"), e.g. at least one input layer 1402 ("Input Layer"), at least one output layer 1404 ("Classification Layer", also referred to as termination layer) and one or more than one processing layer 1406, 1408 between them. The input layer 1402 can define for example a resolution of the incoming image data (here by way of example 120×106 pixels) and/or a color space for the color information of the incoming image data (here by way of example RGB). As an alternative or in addition to RGB (red-green-blue color space), it is also possible to use any other color space which is suitable for the classifier 1307, e.g. some other technical-physical color space such as CMYK (cyan-magenta-yellow-black color space) or else a perceptual color space (which describes for example features such as brightness, saturation and hue) or a grayscale color space. In the case of the grayscale color space, in contrast to the network architecture illustrated, it is possible to use just one channel, e.g. instead of three channels in the case of RGB. It goes without saying that it is also possible to use a different pixel extent of the incoming image data, e.g. 224×224 pixels.

If a convolutional neural network is used as classifier 1307, the one or more than one processing layer can comprise at least one convolutional layer 1406 ("Convolutional Layer") and at least one intermediate layer 1408 ("Fully Connected Layer"). Optionally, between the at least one convolutional layer 1406 and the at least one intermediate layer 1408 (also referred to as fully connected layer), a pooling layer ("Pooling Layer") can be connected (not illustrated).

The incoming image data can be for example multidimensional, e.g. can be represented by means of a corresponding matrix (e.g. the pixels of a grayscale or color image). The matrix (also referred to as tensor in the case of more than three dimensions) can for example reference a first spatial coordinate (e.g. x-coordinate) in a first dimension, for example reference a second spatial coordinate (e.g. y-coordinate) in a second dimension, for example reference the color information (e.g. a point in the color space) in one or more than one third dimension and for example reference the depth information (e.g. z-coordinate) in a fourth dimension. Optionally, e.g. infrared images can also be referenced by means of additional channels, which thus provides the processing of multispectral images. The coordinate of the depth information can be referenced for example along a direction that runs along the direction of capturing the image data and/or transversely with respect to the reference plane 902.

According to the dimension of the image data, the nodes of each convolutional layer 1406 can also be arranged multidimensionally. Optionally, the depth segmenting can comprise removing the dimension of the depth information in order to form the filtered image data. Alternatively or additionally, the depth segmenting can comprise replacing with zeros those entries of the color information of the tensor at which the depth information exceeds a threshold value.

The activity of each node of a convolutional layer 1406 can be calculated by means of a discrete convolution. The discrete convolution of each node can be converted into an output of the node by an activation function. By way of example, an ReLU function can be used as activation function. In the context of artificial neural networks or training methods, an ReLU function (also referred to as rectifier function or else as ReLU for short) is an activation function that is essentially defined as the positive part of its argument.

A plurality of parameters control the scope of the output (also referred to as output volume) of a convolutional layer 1406, for example the parameters of filter number ("depth"), stride ("stride") and padding ("Padding" or "Null-Padding").

The filter number corresponds to the number of filters (here by way of example 18 filters or 12 filters) which are used, each of the filters being trained to search for something different (e.g. specific structures) in the input data of the convolutional layer 1406. The size of a filter can be specified in pixels (here by way of example 7×7 pixels or 5×5 pixels). If for example the image data in the raw data format (also referred to as raw image data) are fed as input data to the first convolutional layer 1406, it is possible to activate different nodes along the depth dimension in the presence of different oriented edges or color spots. The stride indicates how far a filter is displaced. If the stride is equal to 1, then a filter is displaced by one pixel. If the stride is 2 or 3, then the filter is displaced by 2 or 3 pixels, respectively, all at once. Spatially smaller output volumes are produced as a result. In the progression from the input to the output of the classifier 1307, the stride of the convolutional layers 1406 can decrease (here by way of example from 3 to 1). By means of the null-padding, input data can be filled with zeros at the edge. This allows the spatial size of the output data of a convolutional layer 1406 to be controlled.

The at least one (i.e. one or more than one) termination layer 1404 can terminate the network according to the architecture of the multilayer perceptron.

This termination layer 1404 has for example three nodes for three classes ("nothing", "empty", "non-empty"). The upstream intermediate layer 1408 is a so-called hidden layer ("hidden layer"). This intermediate layer 1408 makes it possible to map different decision paths between the last convolutional layer 1406 and the actual classification 1404. This, highly redundant, so-called 1-out-of-n encoding ("One-Hot-encoding") has the advantage that implicit assumptions about similarities of classes do not necessarily have to be made.

Illustratively, the block 1406 composed of convolutional layers can provide the function of feature extraction ("feature extraction") and the one or more than one fully connected intermediate layer 1408 connected downstream of this block can provide the function of decision making ("decision making"), e.g. on the basis of the previously extracted features. These features, or the presence thereof in different regions, could also be transferred directly to the termination layer 1404, although this limits the possible decision paths and may not be sufficient under certain circumstances, depending on boundary conditions present.

A neural network of similar size as classifier 1307, which neural network solves problems that are more generally valid, comprises two or more of such intermediate layers 1408 for decision making.

Since an intermediate layer 1408 accepts the most parameters, it is susceptible to overfitting. In order to counteract this overfitting, a so-called dropout rate p ("dropout rate") can be predefined for this. For this purpose, for each training phase individual nodes are removed from the network with the probability 1-p (here by way of example p=0.5) or are retained with the probability p, such that a reduced network remains. In the training phase, only the reduced network is then trained on the data of this training phase. After the training phase, the removed nodes are added to the network again with their original weights.

The output layer 1404 (also referred to as classification layer) can promote the output of the at least one intermediate layer 1408 into the corresponding classes. By way of example, the output layer 1404 can output a K-dimensional vector σ (here K is by way of example 3) and a softmax function can be used as activation function. The so-called softmax function (also referred to for short as softmax or as a normalized exponential function) is a generalization of the logistic function that transforms a K-dimensional vector with real components into a K-dimensional vector σ likewise as a vector of real components in the value range (0, 1), the components adding up to 1.

The number of nodes (here by way of example 64) of an intermediate layer 1408 corresponds for example to the number of (object) classes which the following termination layer 1404 is intended to distinguish and to the number of possible structure arrangements which the previous layer 1406 extracts.

Examples of the training data for training the classifier 1307 can comprise: image data of the empty recognition region, image data of the recognition region with an empty transport container, image data of the recognition region with a transport container and an acceptable object arranged therein, image data of the recognition region with a transport container and an article (i.e. unacceptable object) arranged therein. Examples of a target variable for training the classifier 1307 can comprise the plurality of image classes.

Alternatively or additionally possible examples of training data can comprise the depth information also being used for training the classifier 1307, such that this illustratively need not necessarily be used only for the depth segmenting.

Alternatively or additionally possible examples of target variables for training the classifier 1307 can comprise the "non-empty" class being subdivided further in order to compare the appearance of the articles with one or more than one reference appearance. Put simply, it is possible for example to ensure that the article (object) arranged in the transport container is also actually an article in respect of which fraudulent behavior can indeed occur (which for example is not property of the customer), i.e. which is also unacceptable.

Examples of the classifier 1307 can comprise various forms of machine learning for image classification, such as, for example:

the so-called "histogram of oriented gradients" (HOG) in combination with a support vector machine (SVM);
a pretrained ANN with "standard architecture" (e.g. GoogLeNet) which is furthermore adapted to the given problem by "transfer learning" and fine adaptation.

However, the latter entails more stringent hardware requirements and/or higher error rates for the given problem since the pretraining database is very different to the input vectors considered here.

FIG. 9 illustrates a checkout terminal 900 in the method 100 in accordance with various embodiments in a schematic side view.

In accordance with various embodiments, the use of the 3D image (i.e. depth image) serves for demarcating the monitored image region and increases the robustness of the recognition as empty. Furthermore, relevant information in terms of data protection laws is reduced to a small amount, and so pictorial recognition of persons and thus a possible infringement of personal data become unlikely.

A 3D camera 102 can be attached to the pole mount system 354 of the checkout furniture 200 in such a way that its perspective is obliquely from above and/or is directed at least partly downward. The perspective (illustratively viewing angle) of the 3D camera 102 permits an imaging of the bottom of the basket (more generally bottom of the transport container 402), of the interior of the transport container 402, and also of the lower repository region of the transport container 402 (e.g. of a shopping trolley). The camera 102 can provide, for example output, 3D images of the transport container 402. By means of the depth information of the 3D images, the background, i.e. the floor 902, can be masked out on the basis of the depth information. Environmental influences and color variations of the transport container 402 and/or of the articles lying in the transport container also do not influence the 3D image. What thus remains is a prototypical silhouette of a transport container 402 which is substantially comparable for example to that for a majority of all commercially available transport containers 402. An algorithm 1307 based on a convolutional neural network classifies the depth profiles thus recorded into three different classes:

"nothing" (situations in which everything apart from a shopping trolley or a partial shopping trolley can be seen);
"empty" (situations in which a shopping trolley that does not contain an article can be seen completely);
"non-empty" (situations in which a shopping trolley that contains at least one article can be seen completely).

The universal 3D lattice structure of a basket (e.g. as a handbasket or part of a shopping trolley) makes it possible to use a highly optimized ANN, which, in contrast to conventional approaches of object recognition, enables a very robust, but nevertheless very rapid classification of images. Consequently, these algorithms do not require any additional computer hardware at all and can be operated on the existing control device 106 of a point of sale 200 (POS—"point of sale"). The control device 106 can be or have been provided by means of a PC, for example.

The classification of the captured image data (e.g. of a video) can output as the result for example in the temporal sequence the following classes successively: "nothing"→"non-empty"→"nothing". Such a temporal sequence then triggers for example a silent alarm as a signal 302 to the cashier 952, and so a transport container 402 that has been recognized as non-empty can be inspected by the cashier in a targeted manner for articles that have not been scanned.

The control device 106 can provide the alarm for example in such a way that the checkout terminal requests acknowledgement of the alarm after the inspection of the transport container 402. Alternatively or additionally, as signal 302, a video (e.g. comprising a sequence of color images) of the directly captured capture region can be output, which is output as an alternative or in addition to the silent alarm on the information output device 124 (e.g. a monitor). The video can show for example the event of the transport container 402 moving past, e.g. in a continuous loop. The objects that are not relevant to the recognition as empty, such as e.g. sales receipts or personal articles of the customer, can easily be identified by the cashier 952, without the process being critically interrupted.

The method described herein can be applied to the manned checkout terminal 900 (i.e. which is operated by a cashier) and/or analogously thereto can be applied to a self-service checkout terminal.

In the case of the self-service checkout terminal, as signal 302, for example, an alarm can be output to an employee, the alarm identifying for example the self-service checkout terminal from which the alarm was output. Alternatively or additionally, at a self-service checkout terminal in reaction to the recognition of a non-empty transport container (e.g. carrying basket), the checkout session 202 can be put into a standby state by means of the signal 302. Alternatively or additionally, at a self-service checkout terminal in reaction to the recognition of an empty transport container (e.g. carrying basket), by means of the signal 302 the checkout session 202 can be continued, for example the initiation or carrying out of the payment process can be enabled.

Conventional mechanisms for recognition as empty comprise for example: a mirror solution on the ceiling or on the checkout furniture opposite, an output of a permanent (or light barrier-triggered) camera stream on the cashier's monitor, ID numbers on the chassis of the shopping trolley, which have to be input in order to enable payment and are thus intended to force the cashier to inspect the trolley. These mechanisms demand permanent attentiveness on the part of the cashier, which may naturally wane. By contrast, the cashier's attentiveness for the method 100 described herein can be concentrated only on the case of a transport container 402 recognized as non-empty or the inspection thereof. The latter is furthermore facilitated by a replay of the recorded image data of the transport container 402 moving past.

Conventional mechanisms for recognition as empty comprise for example: a so-called DataLogic Lanehawk, which carries out a 1:1 identification of articles on the lower trolley repository via camera and object recognition. Such a 1:1 identification of articles by means of object recognition is very susceptible to errors. Furthermore, constant variations of the range and/or packaging of articles have to be managed by renewed training of the algorithm. Moreover, this 1:1 identification only covers the lower repository of the trolley. By contrast, the method 100 in accordance with various embodiments is independent of the appearance of the article and furthermore covers one or more than one repository (e.g. base) of the transport container.

Conventional mechanisms for recognition as empty comprise for example: a so-called StopLift, which uses a ceiling security camera to record color images and carries out a reference image comparison with empty shopping trolleys for the recognition of non-empty shopping trolleys. The use of conventional color images for object recognition is beset by high error rates. Error sources are varying designs of shopping trolleys, lighting conditions and backgrounds (for example on the floor or soiling). An additional factor is a suboptimal perspective and resolution as a result of the use of ceiling cameras. By contrast, the method 100 in accordance with various embodiments enables a very low error rate (e.g. <5%) independently of the location and the type of the shopping trolley.

Conventional mechanisms for recognition as empty comprise for example: a CaddyCheck, which carries out recognition of shopping trolleys with the aid of self-learning algorithms, which requires training for each POS type. By contrast, long training procedures of a number of weeks at the respective site of use (i.e. the checkout workstation) are not absolutely necessary in the case of the method 100 in accordance with various embodiments.

In accordance with various embodiments, the transport container can comprise or be formed from a shopping trolley, a shopping basket or some other trolley (and/or basket), a carrying basket or the like. Alternatively or additionally, the transport container (e.g. the base thereof) can comprise or be formed from a lattice or can be at least partly (e.g. at least the base thereof) not visually opaque. In accordance with various embodiments, the transport container, e.g. the shopping trolley, can comprise a chassis. The chassis can comprise at least three, e.g. at least four, wheels.

In accordance with various embodiments, the transport container can comprise or be formed from plastic and/or a metal, e.g. aluminum and/or steel.

In accordance with various embodiments, the transport container can comprise a grip strip or a pivotable handle with a grip strip.

FIG. 10 illustrates the classifier 1307 in accordance with various embodiments in a schematic construction diagram 1000, for example configured in accordance with the method 100 and/or implemented by means of the control device 106. The explanations concerning FIG. 8 are analogously applicable here.

A description is given below of various examples which relate to what has been described above and what is illustrated in the figures.

Example 1 is a method for the computer-aided recognition of a transport container being empty, the method comprising: determining one or more than one segment of image data of the transport container (e.g. the container interior thereof) using depth information assigned to the image data; assigning the image data to one from a plurality of classes, of which a first class represents the transport container being empty, and a second class represents the transport container being non-empty, wherein the one or more than one segment is not taken into account in the assigning; outputting a signal which represents the filtered image data being assigned to the second class.

Example 2 is the method in accordance with example 1, wherein the one or more than one segment is determined if depth information assigned to the segment satisfies a stored criterion, e.g. exceeds a threshold value.

Example 3 is the method in accordance with either of examples 1 and 2, wherein the one or more than one segment of the image data is marked (e.g. masked) (e.g. by means of a filter mask) in such a way that it is not taken into account in the assigning.

Example 4 is the method in accordance with any of examples 1 to 3, wherein a contour of the transport container is freed by means of the filtering out.

Example 5 is the method in accordance with any of examples 1 to 4, wherein the one or more than one segment represents a background of the transport container, e.g. a surface underneath on which the transport container is situated.

Example 6 is the method in accordance with any of examples 1 to 5, wherein the determining comprises mapping the depth information onto a filter mask which is applied to the image data.

Example 7 is the method in accordance with any of examples 1 to 6, wherein the image data (or the segments thereof) are of the 2D data type or comprise only color information.

Example 8 is the method in accordance with any of examples 1 to 7, wherein the depth information has a plurality of depth values, each depth value of which is assigned to a pixel of the image data (e.g. to a color value of the color information).

Example 9 is the method in accordance with example 8, wherein the determining comprises mapping each pixel, depending on the depth value assigned thereto, onto a pixel of the image data fed to the assigning.

Example 10 is the method in accordance with any of examples 1 to 9, wherein the determining comprises mapping color information of the determined segments (e.g. the depth value thereof satisfies a criterion) onto the same color value (e.g. grayscale value or onto black).

Example 11 is the method in accordance with any of examples 1 to 10, wherein the depth information comprises a plurality of depth values which are encoded in accordance with a color space.

Example 12 is the method in accordance with example 11, wherein depth values encoded in accordance with the color space are provided as a pixel matrix.

Example 13 is the method in accordance with any of examples 1 to 12, wherein the determining comprises mapping the depth information onto a pixel extent of the image data.

Example 14 is the method in accordance with any of examples 1 to 13, wherein the signal is configured (e.g. comprises an instruction) to put a checkout session (e.g. the payment process thereof) into a standby state (e.g. to block it).

Example 15 is the method in accordance with example 14, wherein the checkout session comprises a payment process.

Example 16 is the method in accordance with any of examples 1 to 15, wherein the signal is configured (e.g. comprises an instruction) to display color information of the image data of the transport container (e.g. as a video), e.g. by means of a display device.

Example 17 is the method in accordance with any of examples 1 to 16, wherein the signal is configured (e.g. comprises an instruction) to request a user input, e.g. on a cash register keyboard.

Example 18 is the method in accordance with any of examples 1 to 17, wherein the signal is configured (e.g. comprises an instruction) to output an alarm, e.g. a perceptible alarm and/or a silent alarm (wherein the silent alarm is addressed for example to an employee, e.g. the mobile radio device thereof).

Example 19 is the method in accordance with any of examples 1 to 18, furthermore comprising (e.g. the checkout session comprising): determining payment information on the basis of a product identifier; initiating a payment process on the basis of the payment information.

Example 20 is the method in accordance with any of examples 1 to 19, wherein the image data comprise stereoscopic image data and the depth information is determined on the basis of the stereoscopic image data.

Example 21 is the method in accordance with any of examples 1 to 20, wherein the classifying is effected by means of an artificial neural network.

Example 22 is the method in accordance with any of examples 1 to 21, wherein the artificial neural network is trained on the basis of image data of the empty transport container and/or on the basis of image data of the non-empty transport container.

Example 23 is a control device configured to carry out the method in accordance with any of examples 1 to 22.

Example 24 is a checkout terminal (e.g. comprising a cashier workstation or a self-service checkout terminal) comprising: an image capture device configured to capture the image data; a product capture device for capturing a product identifier of a product when the product is presented to the product capture device; a control device in accordance with example 23, which for example is furthermore configured for determining payment information on the basis of the product identifier, wherein the image capture device (e.g. the capture direction thereof) is oriented for example at least partly downward (that is to say that the capture direction thereof has at least one direction component that is parallel to the direction of gravity).

Example 25 is a nonvolatile storage medium comprising code segments which, when executed by a processor, carry out the method in accordance with any of examples 1 to 22.

The invention claimed is:

1. A method for the computer-aided recognition of a transport container being empty comprising:
   determining one or more segments of an image data of the transport container using depth information that is assigned to the image data but is provided by a 3D camera separately from the image data itself and wherein the determined one or more segments do not belong to the transport container but rather to a background of the transport container;
   filtering out and discarding the one or more segments from the image data determined during said determining before the image data is processed further whereby leaner processing algorithms during further processing;
   assigning, after said filtering, the image data to one of a plurality of classes of which a first class represents the transport container being empty and a second class represents the transport container being non-empty, wherein the one or more segments is not taken into account during said assigning; and
   outputting a signal which represents the image data being assigned to the second class.

2. The method as claimed in claim 1 wherein said determining is further defined as:
   determining the one or more segments of the image data of the transport container using depth information assigned to the image data but provided by a 3D camera separately from the image data, wherein the one or more segments is determined if the depth information assigned to the one or more segments satisfies a stored criterion.

3. The method as claimed in claim 1 wherein the one or more segments of the image data is not taken into account in the assigning.

4. The method as claimed in claim 1 wherein a contour of the transport container is freed by means of filtering.

5. The method as claimed in claim 1 wherein the one or more segments represents a background of the transport container.

6. The method as claimed in claim 1 wherein said outputting is further defined as:
   outputting the signal which represents the image data being assigned to the second class and also comprises an instruction to put a checkout session into a standby state.

7. The method as claimed in claim 6 wherein the checkout session further comprises:
   determining a payment information on the basis of a product identifier; and
   initiating a payment process on the basis of the payment information.

8. The method as claimed in claim 1 wherein said outputting is further defined as:
   outputting the signal which represents the image data being assigned to the second class and also comprises an instruction to display color information of the image data of the transport container.

9. The method as claimed in claim 1 wherein said outputting is further defined as:
   outputting the signal which represents the image data being assigned to the second class and also comprises an instruction to request a user input.

10. The method as claimed in claim 1 wherein said outputting is further defined as:
    outputting the signal which represents the image data being assigned to the second class and also comprises an instruction to output an alarm.

11. The method as claimed in claim 1 wherein the image data comprises stereoscopic image data and the depth information is determined on the basis of the stereoscopic image data.

12. The method as claimed in claim 1 wherein said assigning is further defined as:
    assigning, after said filtering, the image data to one of a plurality of classes of which a first class represents the transport container being empty and a second class represents the transport container being non-empty, wherein the one or more segments is not taken into account during said assigning, and effected by means of an artificial neural network.

* * * * *